Nov. 17, 1970  W. A. CHAMBERS ET AL  3,541,249
ADAPTIVE TARGET TRACKING SYSTEM
Filed Sept. 30, 1966  10 Sheets-Sheet 1
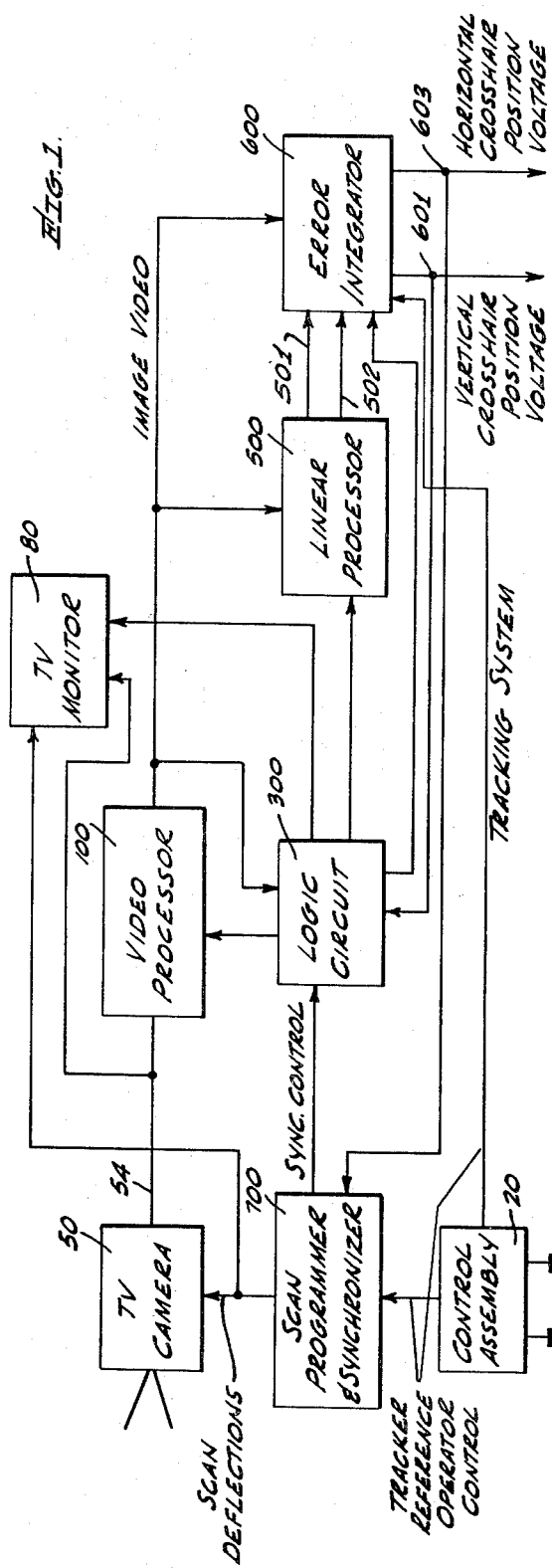
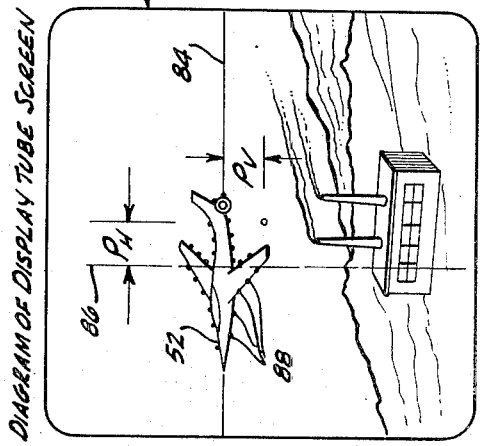
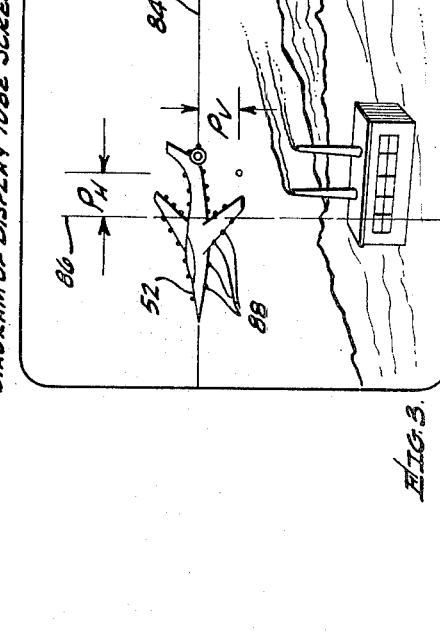
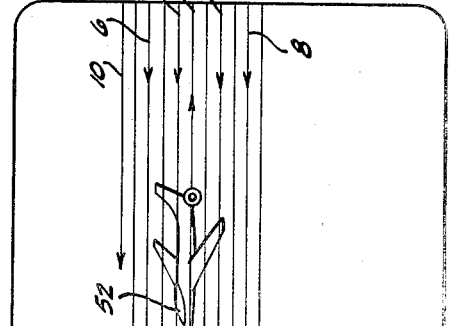
INVENTORS.
WILLIAM A. CHAMBERS,
PAUL R. PRINCE,
J. K. Haskell
ATTORNEY.

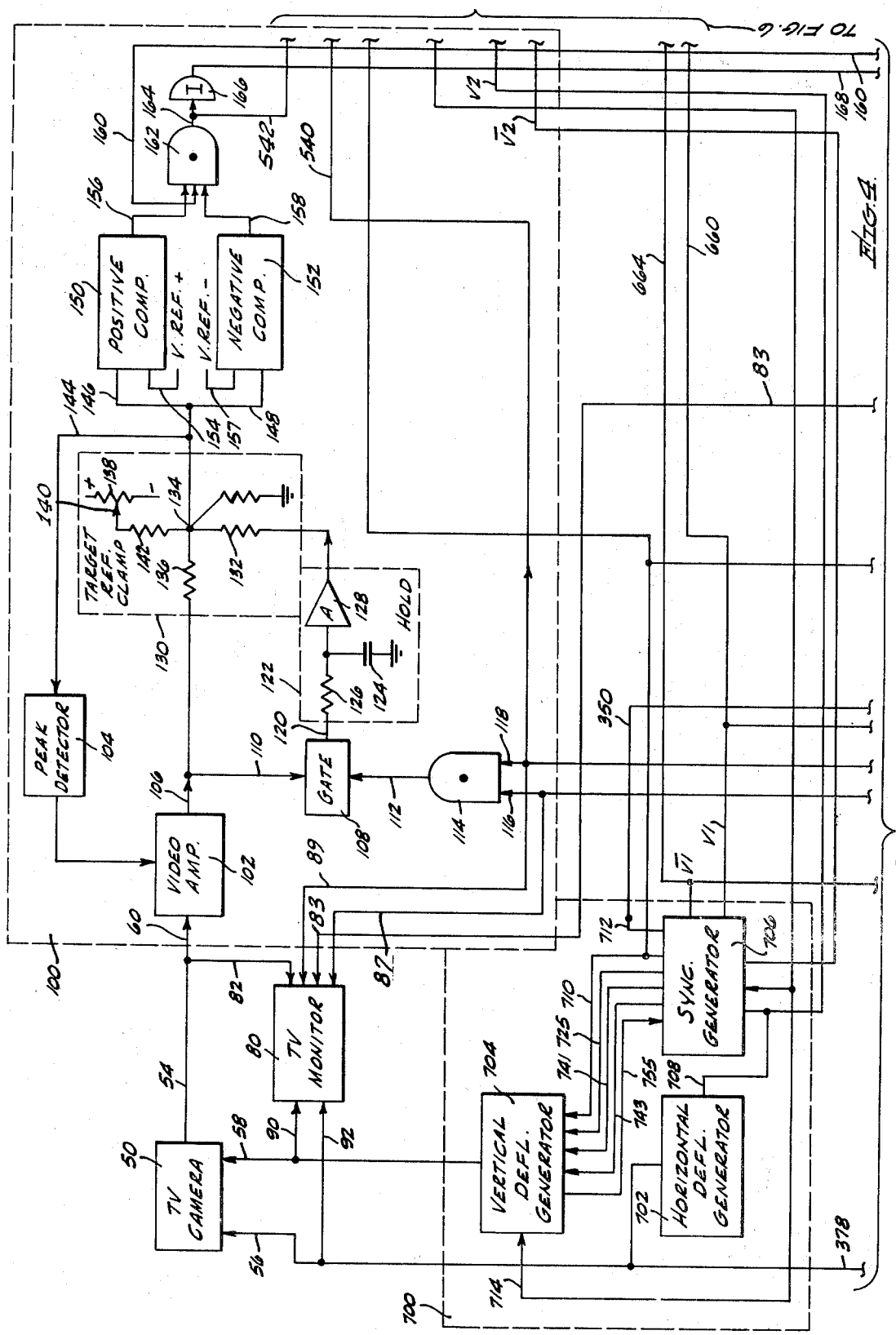

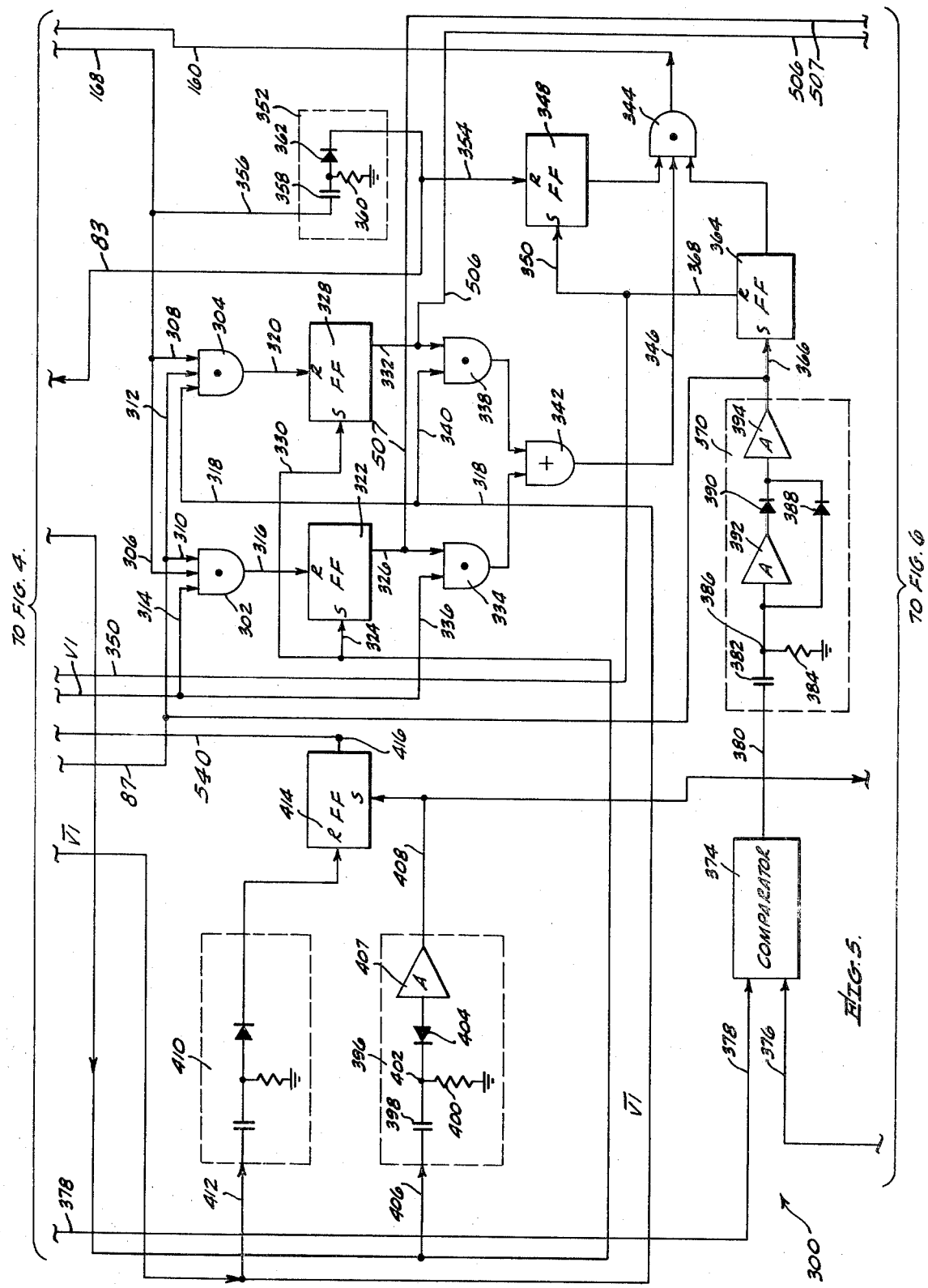

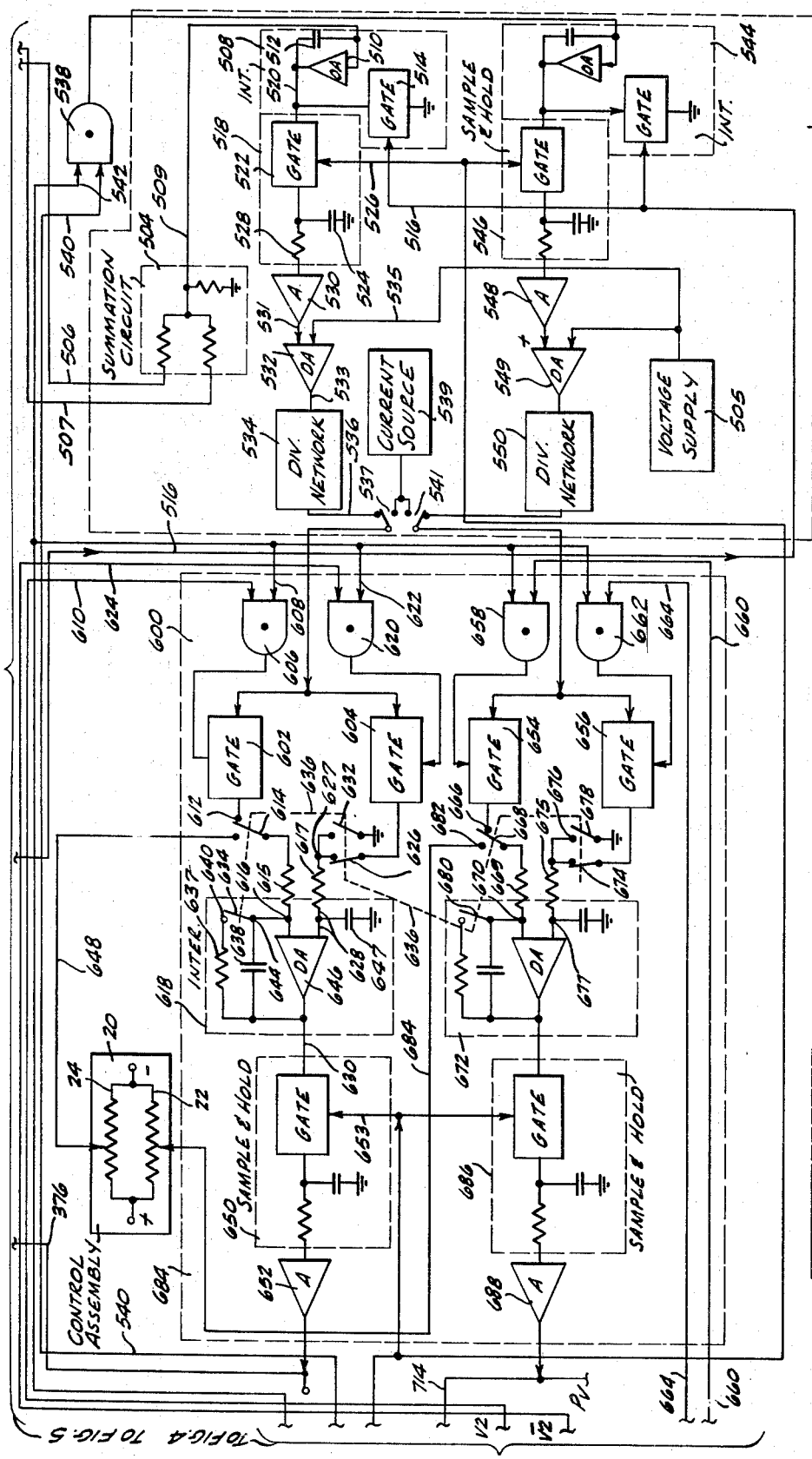

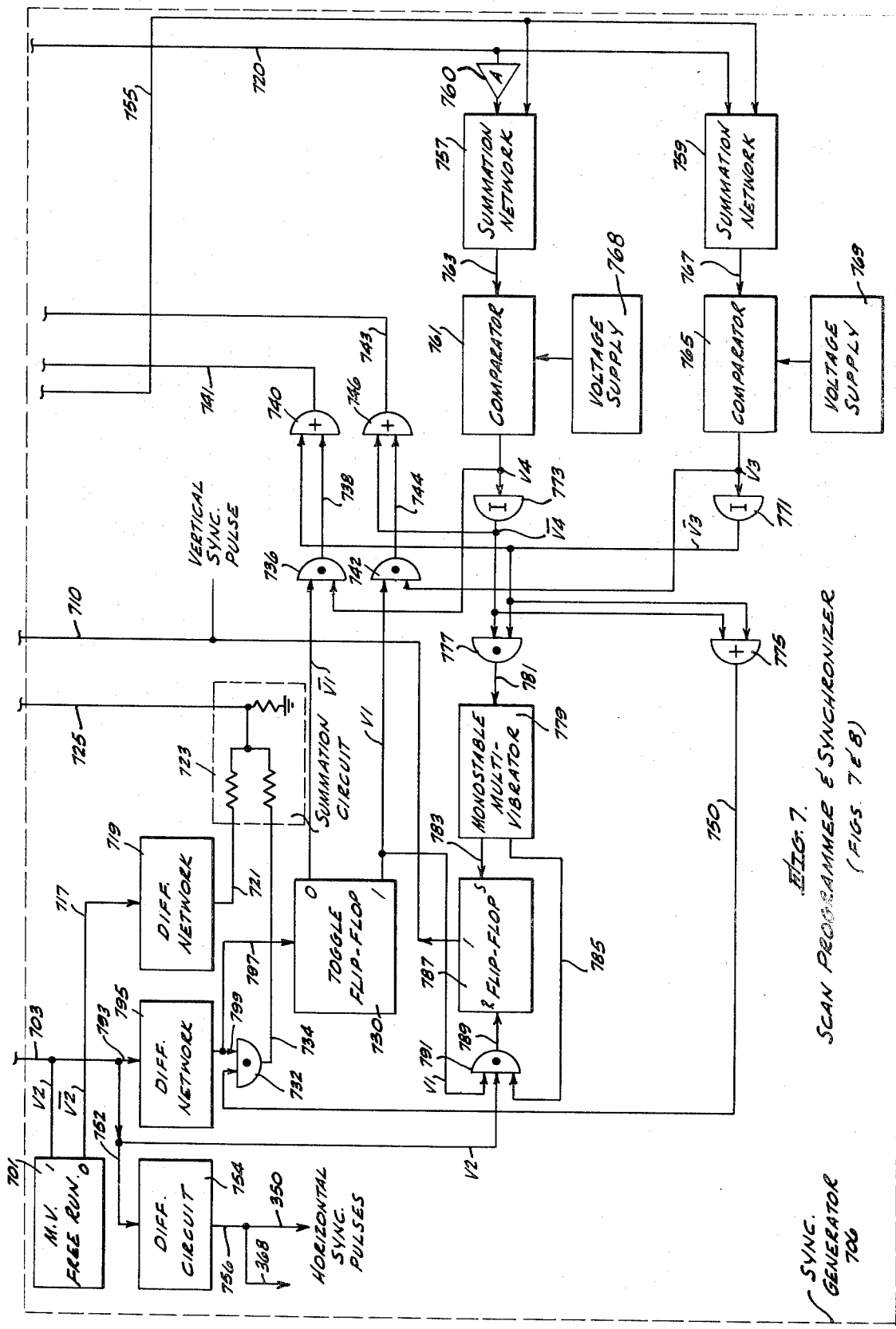

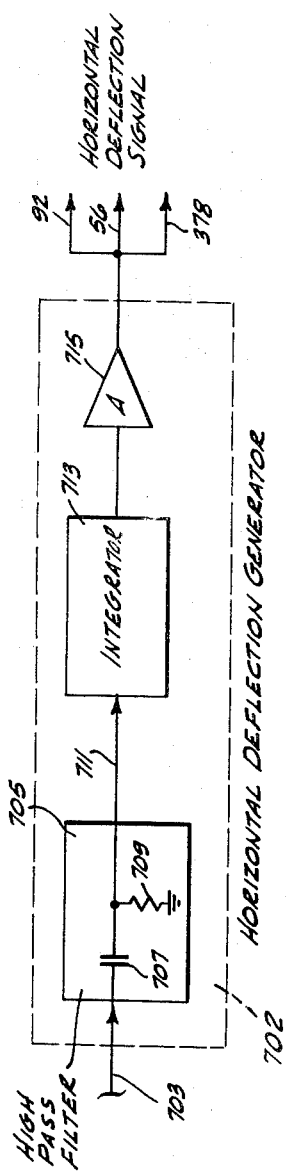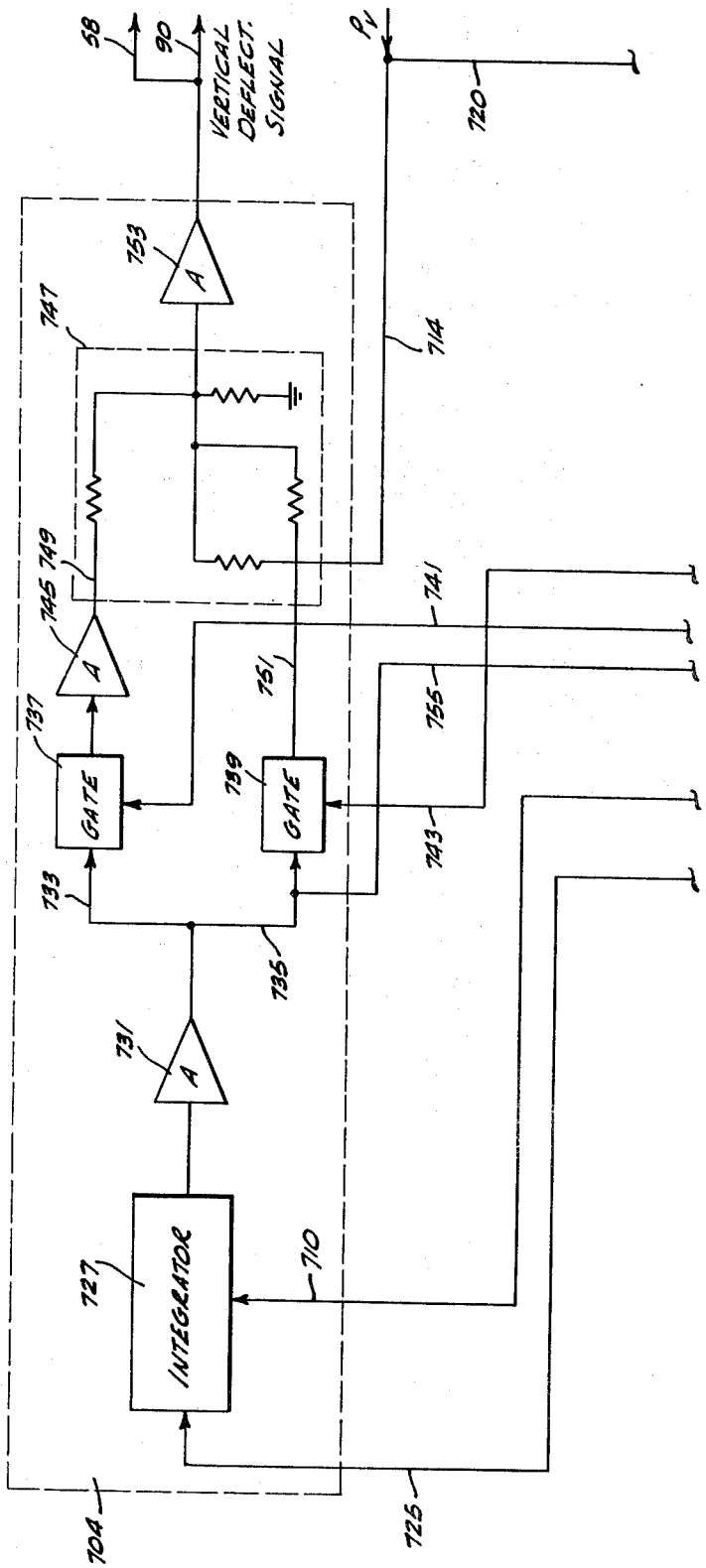

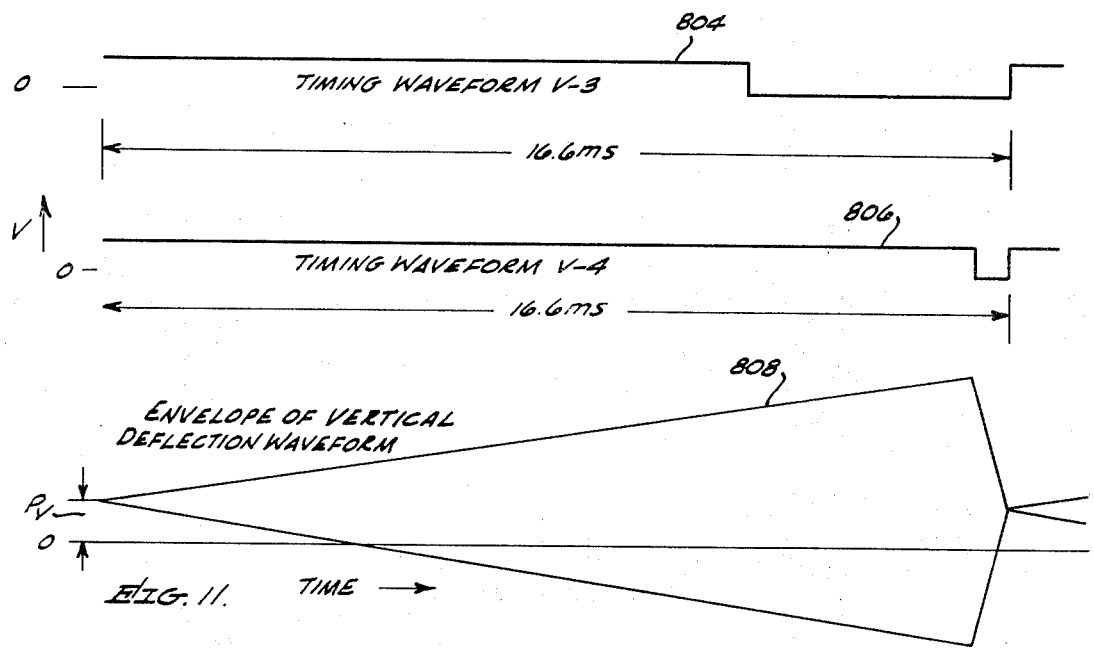
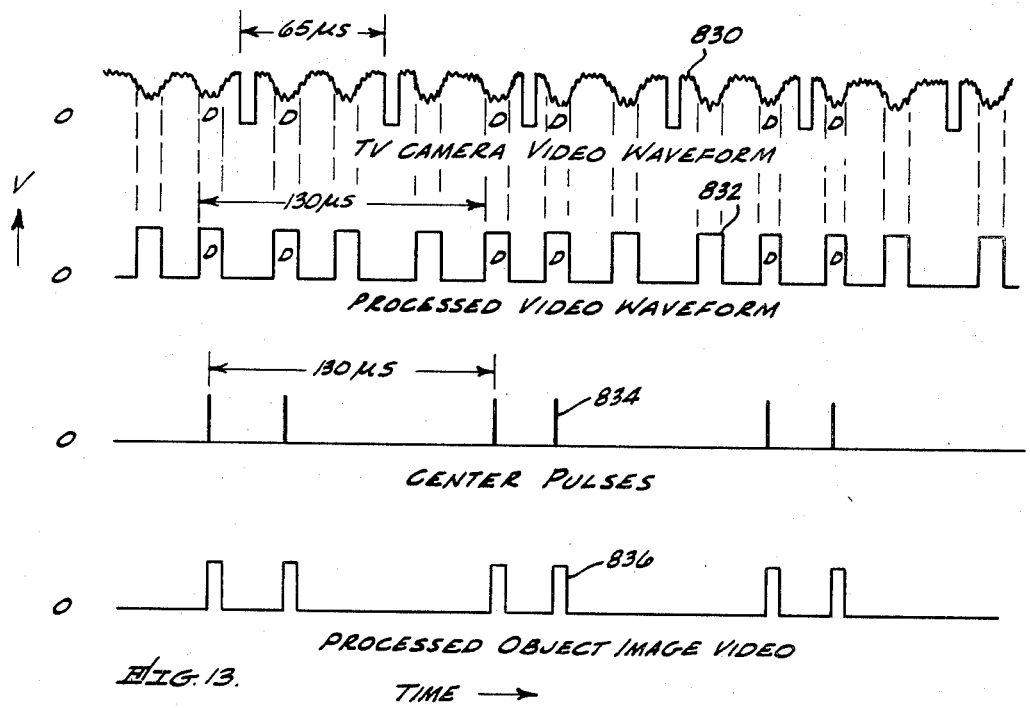
FIG. 11.
FIG. 13.

EXPANDED DIAGRAM OF READOUT SCAN PATTERN

United States Patent Office 3,541,249
Patented Nov. 17, 1970

3,541,249
ADAPTIVE TARGET TRACKING SYSTEM
William A. Chambers, Torrance, and Paul R. Prince, Hawthorne, Calif., assignors to Hughes Aircraft Company, Culver City, Calif., a corporation of Delaware
Filed Sept. 30, 1966, Ser. No. 583,355
Int. Cl. H04n 7/18
U.S. Cl. 178—6.8          13 Claims

ABSTRACT OF THE DISCLOSURE

A system for tracking the angular position of the center of a designated one of a plurality of objects where, in one embodiment, a transducer apparatus is responsive to received energy for sequentially developing and applying signals representative of object area increments in selected quadrants within a field of view of a selected area to a logic circuit which, in turn, develops output signals representative of object area increments of only the designated object. A linear processor divides the designated object area incremental signals by a function of two transverse dimensions of the designated object and applies first and second incremental linear dimension signals to an integrator circuit, which, in turn, determines the relative angular position of the center of the designated object.

---

This invention relates to tracking systems, and particularly to novel and improved video tracking systems that provide accurate and stable tracking substantially unaffected by large variations of the object image size.

Video tracking systems provide voltages representative of the location of a designated object relative to the field of view of a sensor. For objects which can reasonably be approximated as a point source, edge tracking systems, which determine the relative location of an edge of the designated object, have been utilized. However, in these conventional systems tracking error is proportional to the size of the image tracked resulting in these systems being unacceptable for many applications involving images of finite area. In recent years, much effort has been devoted to producing an accurate, reliable image area centered tracker of an accepable level of equipment complexity. Some prior tracking systems are based on direct comparisons of object image areas and consequently possess tracking accuracy and stability which are a function of object image size and require complex circuitry of very large dynamic range. These later characteristics are particularly limiting in systems for tracking objects of significant image areas encountered in such applications as terminal homing missile guidance. Also, as is well known in the art, improved tracking performance is achieved when noise and background discrimination is provided by an area tracking gate approximating the contour of the designated object image. Present trackers are unable to provide true inter-contour gating, i.e., the tracking gate coincident with the contour of the first intensity variation of the object image to be tracked.

It is therefore an object of this invention to provide a novel and improved tracking system that provides accurate and stable object image tracking substantially independent of the image size.

It is a further object of this invention to provide a tracking system which utilizes a unique image plane sensor readout scan pattern and an incremental method of error accumulation that greatly reduces equipment dynamic range requirements.

It is a still further object of this invention to provide a tracking system that develops signals representative of incremental image areas modified by a function of a linear image dimension to provide, with a minimum of dynamic range requirements, tracking accuracy and stability essentially independent of object size and range.

It is another object of this invention to provide a tracking system that utilizes tracker gating adaptive to the object image contour to improve noise and background discrimination.

The system, in accordance with the principles of this invention, utilizes a transducer, including a sensor located at the image plane of an optics system, for forming an image of selected area surrounding and including a designated object. The tracking portion of the system, in accordance with the principles of this invention, measures the distance of the area center of the chosen object image from a tracker frame of reference, such as display crosshairs or tracker gate position, and makes corrections to the position of this tracker reference to null that distance. The position voltages of the tracker reference are then representative of the location of the object image on the screen and thus the position of the object in the coordinate system of the transducer. Any change in the relative position of the designated object due to motion between sensor and the object is detected and the position voltages are quickly and accurately updated to provide effective tracking.

One of the main advantages of the system of this invention is the ability to accommodate large variations in the object image area with accuracy, stability and reasonable dynamic range requirements on tracker circuitry. This is accomplished by dividing signals representing incremental areas of the designated object by a linear dimension of the object and by an incremental error accumulation method. Another advantage of this system is the utilization of a tracker gating mechanization which very closely approximates the contour of the object image being tracked.

The novel features which are believed to be characteristic of the invention both as to its organization and method of operation, together with further objects and advantages thereof, will be better understood from the following description considered in connection with the accompanying drawings in which like characters refer to like parts and in which:

FIG. 1 is a block diagram showing the tracking system in accordance with this invention;

FIG. 2 is a diagram depicting the readout scan pattern of a TV (television) camera that may be utilized in the system of FIG. 1 for explaining the operation of the system in accordance with the invention;

FIG. 3 is a diagram of the screen of the display tube that may be utilized in the system of FIG. 1 for further explaining the operation of the system in accordance with the invention;

FIGS. 4, 5 and 6 are schematic block and circuit diagrams for further explaining the system in accordance with the invention.

FIGS. 7 and 8 are schematic block and circuit diagrams suitable for the mechanization of the synchronization generator, the horizontal deflection generator and the vertical deflection generator of FIG. 4.

FIGS. 11, 12 and 13 are voltage vs. time diagrams for explaining the operation of the system in accordance with the invention.

Figure 9:
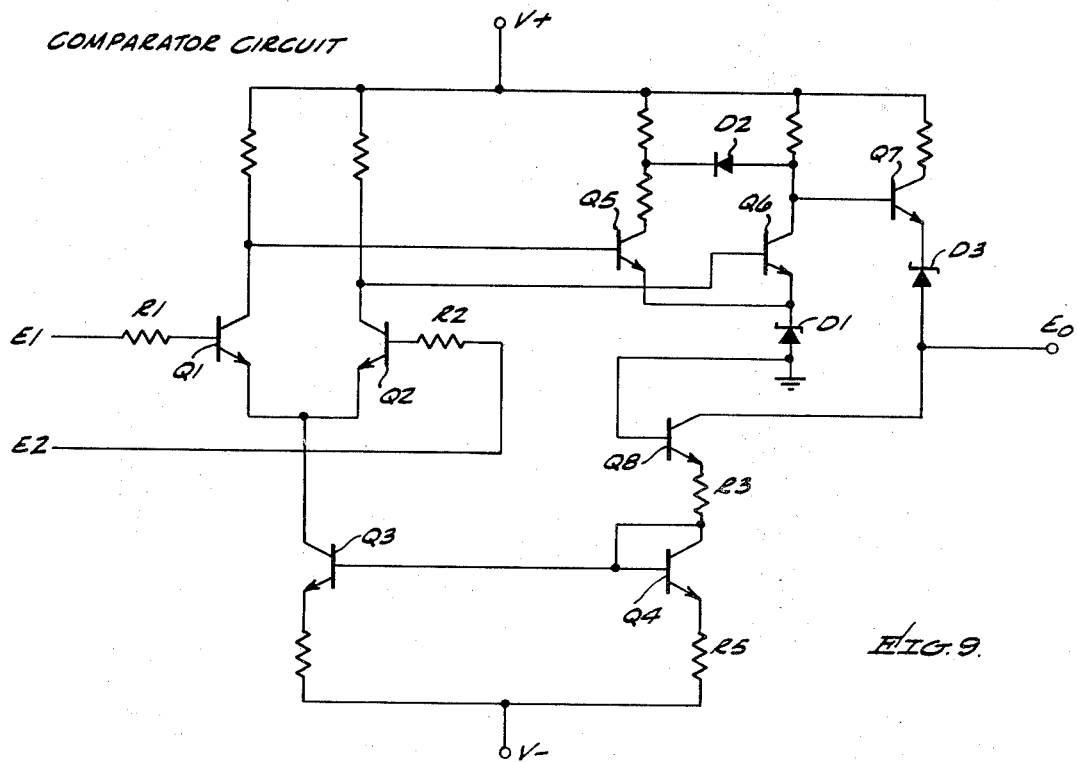
FIG. 9 is a schematic diagram of a suitable comparator circuit for the system of FIGS. 4, 5 and 6.

The system in accordance with this invention will first be generally described at the functional level in conjunction with FIG. 1, followed by a more detailed discussion of the system embodying the principles of the invention shown in FIGS. 4, 5 and 6.

Referring to FIG. 1, a TV camera 50, including a transducer surface, an electron readout beam and deflection plates, forms an image of objects within its field of view on the transducer surface. The electron readout beam is controlled by potentials on the deflection plates provided by a scan programmer and synchronizer unit 700 and the resulting readout electron beam scan pattern is as shown in FIG. 2. Each vertical readout sequence or frame is composed of a plurality of horizontal lines and the first horizontal sweep line of each frame starts within an image 52 of an object designated to be tracked. Pairs of horizontal lines are scanned alternately above and below the approximate vertical center of the image in a sequence progressing from the approximate vertical center of the object image to the vertical extremes (top and bottom) of the transducer screen during each vertical frame. Horizontally, the scanning pattern travels, for example, from left to right and then back from right to left to complete one horizontal line pair.

Referring again to FIG. 1, the scanning readout electron beam of the TV camera 50 interacts with the transducer surface to produce a video signal, at an output terminal 54, which is representative of the relative energy intensity of the portion of the transducer surface being readout by the electron beam. A TV monitor 80, well known in the art, includes a display surface, deflection plates and an electron beam for forming images on the display surface in response to video input signals. The display electron beam is positioned by scan deflection signals applied to the deflection plates of monitor 80 from the scan programmer and synchronizer unit 700. Camera video and intensity signals are applied to the monitor 80 from the TV camera 50 and a logic circuit 300 respectively. A representative monitor display, shown in FIG. 3, includes images of objects within the sensor's field of view 81, a horizontal intensified line 84 and a vertical intensified line 86, which will be referred to as cross hairs, and intensity markers 88 outlining the contour of the designated object image 52 being tracked. The position of the horizontal cross hair 84 divides the designated object image into upper and lower sections, as well as indicates the vertical starting position of the scan readout electron beam. The vertical cross hair 86 divides the object image into right and left portions and is the horizontal tracking reference.

Again referring principally to FIG. 1, the object to be tracked is designated by means of a pair of non-interacting independent controls 22 and 24, which may be potentiometers, of a control assembly 20 that an operator manipulates so that the intersection of the cross hairs is within the designated image of the object such as 52 to be tracked on the display of TV monitor 80.

A video processor unit 100, in response to camera video provided by the TV camera 50 and timing signals from the logic circuit 300, generates a series of fixed amplitude image video pulses that start during each horizontal display sweep at the time occurrence of, or while sweeping past the vertical cross hair 86 of FIG. 3, and terminates when the beam is at the designated image object perimeter. These pulses correspond to increments of area and each pulse represents a small portion of the target from one quadrant. For example, odd-numbered pulses correspond to increments in target area to the right of the horizontal center of the target or the vertical cross hair 86 and even-numbered pulses correspond to increments to the left of the vertical cross hair. Similarly, odd-numbered pairs of pulses correspond to area above the vertical center of the designated image or the horizontal cross hair 84 while even-numbered pairs correspond to area below the center. Because of the order in which these small area increments occur in time, an addition-subtraction-addition-subtraction method of error accumulation can be utilized in both the horizontal and vertical directions by positive and negative integration of properly gated incremental area pulses.

Two separate channels of a linear processor unit 500, in response to timing signals from the logic circuit 300 and output image pulses from video processor 100 develop output signals on a pair of leads 501 and 502 which have amplitudes equal to a predetermined constant value divided by the height and width of the designated object image, respectively. An Error integrator unit 600 gates the output signal on the lead 501 as a function of the occurrence of the image video pulses from the video processor 100 and then integrates this gated current signal in such a manner that odd-numbered pulses (indicative of one side of the vertical cross hair 86) drive an integrator potential level at a terminal 601 in one direction and even-numbered pulses (indicative of the other side of the vertical cross hair) drive the integrator potential level in the opposite direction. The potential at the terminal 601 is coupled to the logic circuit 300 wherein the vertical cross hair 86 is position updated to the approximate horizontal center of the designated object.

Also, in the error integrator unit 600 the output signal on the lead 502 is gated by image video pulses and then integrated such that odd-numbered pairs of pulses (indicative of one side of, that is above or below, the horizontal cross hair 84) drive an integrator potential level at a terminal 603 in one direction and even-numbered pairs of pulses (indicative of the other side of the horizontal cross hair) drive the potential level in the opposite direction. The terminal 603 is coupled to the scan programmer and synchronizer unit 700 to readjust the start of the vertical readout scan pattern to the approximate vertical center of the designated object.

Referring now to FIGS. 4, 5 and 6 showing the system embodying the principles of the invention in more detail, the conventional Videcon TV camera 50 produces a video signal at the output terminal 54 which is representative of the relative energy intensity of the portion of the TV camera tube surface being readout by the scanning electron beam.

The electro-static deflection plates (not shown) of the TV camera 50 position the readout electron beam in response to a horizontal deflection signal coupled on a lead 56 from a horizontal deflection generator 702 and a vertical deflection signal coupled by a lead 58 from a vertical deflection generator 704.

The horizontal deflection generator 702 is provided timing signals by a sync. (synchronization signal) generator 706 on a lead 708, and the vertical generator 704 is controlled by timing and logic signals on leads 710, 725, 741 and 743 from the sync. generator 706. The DC (direct current) voltage level at the start of the vertical deflection signal on the lead 58 and hence the vertical position of the readout beam at the start of the vertical scan sequence is determined by the potential applied to a lead 714 from the integrator 600. A detailed mechanization of the sync. generator 706, the horizontal generator 702 and the vertical generator 704 is shown in FIGS. 7 and 8 and will be discussed in detail subsequently but for now it may be assumed that in response to the potential applied to the lead 714 the vertical deflection generator causes the readout scan pattern to start at the approximate vertical center of the image of a designated object to be tracked. The subsequent description will explain how the system of FIGS. 4, 5 and 6 in accordance with the principles of the invention closes a vertical control loop through the lead 714 to justify the above-stated assumption. As will be explained subsequently, the elevation and azimuth error signals developed by the system of FIGS. 4, 5 and 6 may control a suitable servomechanism (FIG. 15) which maintains the TV camera 50 properly pointed at the object being tracked.

The video signal at the output terminal 54 of the TV camera 50 is applied via a lead 60 to a conventional video amplifier 102 of the video processor unit 100. The gain of the amplifier 102, in response to the output of a conventional peak detector circuit 104, is adjusted to maintain the amplified peak to peak video signal at a terminal 106 within a predetermined voltage range. This output signal at the terminal 106 is applied to a conventional video gate 108 through a lead 110. The gate 108 is controlled by gating pulses coupled on a lead 112 from an AND gate 114.

All AND gates of the system of FIGS. 4, 5 and 6 may be of any suitable conventional type that produces a high level output signal only when all inputs to the gate are at the high level state. In the illustrated system for all logical signals at the AND and OR gates and at the flip-flops an arbitrary positive potential may be considered indicative of the high level signal state and approximately zero potential representative o fthe low level signal state. It is to be understood that the principles of the invention are applicable to any desired signal levels representative of true and false states and to any type of logic such as the illustrated logic or to inverted logic. The AND gate 114 produces a high level output pulse on the lead 112 only when input signals, indicative of the occurrence of the vertical cross hair 86 (FIG. 3) coupled on a lead 116, and the horizontal cross hair 84 (FIG. 3) on a lead 118 are simultaneously presented to the AND gate 114. The output signal of the gate 108 is applied through a lead 120 to a hold circuit 122. A capacitor 124 of hold circuit 122 is charged by the signal on lead 120 through a resistor 126. The voltage level of the capacitor 124 is amplified and inverted by a conventional DC amplifier 128 and then coupled by a summing resistor 132 to a junction 134 of a target reference clamp circuit 130. The video signal at terminal 106 is coupled to the junction 134 through a summation resistor 136. A threshold control 138 is a potentiometer connected between suitable positive and negative voltage supplies with a wiper 140 that is coupled through summation resistor 142 to the junction 134. The signal level at junction 134 is the sum of the voltages coupled by resistors 132, 136 and 142, and is representative of the video signal of terminal 106 with an adjustment of its DC value such that the video voltage level at the occurrence of the gating pulse on lead 112 is a predetermined value, e.g., the video at this point could be clamped to ground. The output lead of target reference clamp circuit 130 is coupled on leads 144, 146 and 148 to the peak detector 104, a positive comparator 150 and a negative comparator 152 respectively. The positive comparator 150, as is well known in the art, provides a high level output signal only during the time that the video input signal on lead 146 is less positive than a predetermined reference potential, designated $V_{ref.+}$, that is coupled to the comparator 150 on a lead 154. The negative comparator 152 produces a positive output signal only during the period that the video input signal on the lead 148 is more positive than a predetermined reference potential designated $V_{ref.-}$, coupled on a lead 157 to comparator 152.

It should be noted that the threshold level of the target reference clamp circuit 130 and the reference levels of comparators 150 and 152 are functionally related in such a manner that the comparators' output signals on leads 156 and 158 are simultaneously at the high signal level only during the time period that the TV camera video is within a predetermined voltage level range of its value sampled at the intersection of the tracker cross hairs. This is due to the fact that the target reference clamp circuit 130 shifts the DC potential of the TV camera video to a value such that the voltage level of the video at the intersection of the cross-hairs will be in the approximate center of a voltage discrimination window formed by the combination of comparators 150 and 152. This signal amplitude discrimination operation will be better understood by particular reference to FIG. 9 which shows a representative type of high speed differential comparator. N-P-N transistors Q1 and Q2 are biased by currents provided by input voltages E1 and E2 through resistors R1 and R2 respectively. When the circuit of FIG. 9 operates as the positive comparator 150, the leads 146 and 154 are respectively coupled to E1 and E2 and when the circuit operates as the negative comparator 152, the leads 148 and 157 are respectively coupled to E2 and E1. Transistors Q1 and Q2 compose a conventional balanced differential input stage and are supplied emitter current from a constant current source that includes transistor Q3, representing a high impedance source, and transistor Q4 in a diode configuration for temperature tracking. A balanced second stage is utilized with transistor Q6 being the second stage amplifier while transistor Q5 provides biasing for transistor Q6 such that the differential output signal of the input stage is supplied across the base-emitter junction of transistor Q6. A Zener diode D1, coupled to the emitter of transistors Q5 and Q6, provides large input voltage range capabilities and diode D2 limits the positive voltage level at the collector of transistor Q6. A N-P-N transistor Q7 is connected in a conventional emitter follower configuration with a Zener diode D3 providing a DC shift in the output circuit. A transistor stage comprising Q8 isolates the output signal from the constant current source bias divider of resistor R3, transistors Q4 and R5.

Referring now to FIG. 4 as well as the comparator circuit of FIG. 9, leads 146 and 154 of FIG. 4 are coupled to inputs E1 and E2 respectively of the circuit of FIG. 9 for providing the positive comparator 150. When the video signal potential at E1 is less positive than the positive reference voltage at E2, transistor Q6 is biased towards cut-off and $E_o$ assumes the high level signal state. Also, for providing the negative capacitor 152, the leads 148 and 157 of FIG. 4 are connected to a second comparator circuit of the type shown by FIG. 9 but now the video signal on lead 148 is coupled to the E2 input terminal and the negative reference voltage of lead 157 is coupled to the E1 input terminal so that $E_o$ assumes the high level state during the period the video signal exceeds the reference voltage. Consequently, the output signals on leads 156 and 158 are simultaneously at the high level state only during the period that the input signal voltage is more positive than the voltage of $V_{ref.-}$ and less positive than $V_{ref.+}$; that is, only when the video signal is in a predetermined voltage amplitude discrimination range about a voltage level determined by that of the image designated to be tracked.

Referring again to FIGS. 4, 5 and 6, the output signals on leads 156 and 158 are coupled to a conventional AND gate 162. Also, coupled to an input terminal of the AND gate 162 is a logic type signal on a lead 160. This logic signal will be developed subsequently, but for now it may be assumed that it is at the high state only after the occurrence of the vertical display cross-hair intensity mark, that is at the time during the horizontal sweep that the beam crosses the vertical reference line, if the designated image video is present and has been consistently so present at the vertical cross-hair during each horizontal readout scan since the start of a vertical readout frame. Consequently, the signal at the terminal 164 of the AND gate 162 is at the high level state only during the presence of the designated image video after the occurrence of the vertical cross-hair if there has been no discontinuity of such crossings above the horizontal cross-hair position while the scan is above it, or below the horizontal cross-hair while the scan is below it.

The signal on the terminal 164 is applied to a conventional inverter 166, which may be a common emitter transistor circuit, and an output signal is developed thereupon and applied to a lead 168. This output signal is the compliment of the input signal at the terminal 164 described previously.

The signal on the lead 168 is applied to AND gates 302 and 304 on respective leads 306 and 308, which AND gates are part of the logic circuit 300. A series of center pulses are applied to the input of AND gate 302 and 304 on respective leads 310 and 312. These center pulses are coincident in time with the occurrence of the vertical cross-hairs, that is, at the time that the electron beam is at the vertical cross-hair position. A lead 314 couples a signal V1 from the sync. generator 706 to the AND gate 302. The signal V1 is at the high level state during odd pairs of horizontal readout scans and at the low level during even pairs of horizontal readout scans. Only when all the signals on the leads 306, 310 and 314 are at the high level is the output signal on lead 316 at the high level which is indicative of the occurrence of of the approximate top of the center of the designated image on the readout transducer screen.

Similarly, a signal $\overline{V1}$, which is the complement of the signal V1 described previously, is coupled on a lead 318 from the sync. generator 706 to the AND gate 304. At the time the signals on the leads 308, 312 and 318 are all at the high signal level the AND gate 304 provides a high level output signal to a lead 320, which indicates the occurrence of a lower edge of the designated image at its center on the readout screen.

The output signal of AND gate 302 is coupled to the reset terminal of a conventional R–S type flip-flop 322 which provides a high level output signal when set by a high level pulse on a lead 324 with this output signal remaining a the high level until reset by a high level signal on the lead 316. Also it should be noted that all flip-flop circuits of the system of FIGS. 4, 5 and 6 are the conventional R–S type, one particular such suitable flip-flop is shown on page 38 of the July 25, 1966, issue of Electronics Magazine. The vertical sync. pulses from the syn. generator 706, coupled by lead 324 to the flip-flop 322, switches the output signal of the flip-flop to the high level state and the output pulses of the AND gate 302 reset the output signal level to the low state. The output signal of the flip-flop 322 at the terminal 326 is therefore representative of the time from the start of the vertical readout scan pattern until the occurrence of the top along the horizontal center or vertical cross-hair 86 (FIG. 3) of the designated image. In a similar manner, a flip-flop 328 is set by the vertical sync. pulses coupled on a lead 330 and reset by the output signal of the AND gate 304. The output signal of the flip-flop 328 at a terminal 332 is representative of the time from the start of the vertical readout scan pattern until the occurrene of the lower extreme along the horizontal center or cross-hair 86 (FIG. 3) of the designated image. The signal V1, described above, is coupled on a lead 336 from the sync. generator 706 to an AND gate 334, as is the signal at the terminal 326 of the flip-flop 322. The output signal of the AND gate 334 is composed of a series of pulses which continue for a time period which is representative of the height along the vertical cross-hair designated image above the horizontal cross-hair. The signal $\overline{V1}$ is coupled to an AND gate 338 on a lead 340 as is the signal on terminal 332 of the flip-flop 328. The output signal of the AND gate 338 is a series of pulses which continue for a time period which is representative of the height along the vertical cross-hair of the designated image below the horizontal cross-hair. The outputs of the AND gates 334 and 338 are applied to an OR gate 342. The OR gate 342 is the conventional type which provides a high level output signal during the time period any or all of its inputs are at the high signal level. The output of the OR gate 342, which is positive during the time that the scanning beam is reading out the designated object image, is coupled to an AND gate 344 through a lead 346.

Also connected to the AND gate 344 is the output signal of a flip-flop 348. The flip-flop 348 is set so that the output signal is at a high level state in response to the horizontal sync. pulses which are coupled from the sync. generator 706 on a lead 350 and is reset to the low level value by the output signal of a differentiating circuit 352 applied to the flip-flop through a lead 354. Inverted image video pulses from the lead 168 of the inverter circuit 166 are applied through a lead 356 to the differentiating circuit 352, wherein the image video pulses are differentiated by the interaction of a capacitor 358 and a resistor 360. A diode 362 allows only the positive spikes to be coupled to the flip-flop 348. These positive pulses are provided coincident in time with the trailing edge of the image video pulses. Thus, the output signal of the flip-flop 348 is positive from the time of the horizontal sync. signal to the time corresponding to the trailing edge of the designated image video.

A third input to the AND gate 344 is provided by a flip-flop 364 which is set to the high level state by the pulses applied on a lead 366 and reset to the low level state by the horizontal sync. pulses from the sync. generator 706 coupled through a lead 368. The pulses on the lead 366 are time coincident with the occurrence of the vertical cross-hair or formation of the marker pulse therefor and are developed by processing the output pulses of a comparator 374 through a differentiating circuit 370. The output of differentiating circuit 370 consists of positive pulses coincident in time with the leading and trailing edges of the pulses of the output signal of the comparator 374. A vertical cross-hair position voltage, which will be developed subsequently, coupled on a lead 376 is compared to the horizontal deflection signal, coupled from the horizontal deflection generator 702 on a lead 378, in comparator 374. Comparator 374 may be identical to the circuit described previously for comparator 152 and its operation is the same. The output signal on a lead 180, is at the high level during the period of time that the deflection signals on the lead 378 is more positive than the vertical cross-hair position voltage on the lead 376.

The pulsed signal on the lead 380 is differentiated by the interaction of a capacitor 382 and a resistor 384, so that a positive voltage spike, coincident with the leading edge of the input pulse, and a negative signal spike, coincident with the trailing edge, are produced at a junction 386. The positive spike is transmitted by a diode 388 and the negative spike is reversed in polarity by a conventional amplifier 392 and then transmitted by a diode 390. The output signals of the diodes 388 and 390 are summed in the input circuit of a conventional amplifier 394. The output signal of amplifier 394 is the series of center pulses coincident in time with the vertical cross-hair and is coupled to the flip-flop 364 as discussed previously.

To summarize the characteristics of the input signals to the AND gate 344, which have been developed in the above-described circuits, the output signal of the flip-flop 348 is positive from the start of a horizontal scanning line until the trailing edge of the designated object image. The signal on the lead 346 is positive from the commencement of a vertical scan frame until the top of the image center for the designated object has been reached while the scan is above the horizontal cross-hair position, and this signal on the lead 346 is also positive from the commencement of the vertical frame, until the lower extreme of the image center for the designated object has been reached while the scan is below the horizontal cross-hair position. The output signal of the flip-flop 364 is positive during the period commencing at the occurrence of the vertical cross-hair position pulse and ending with the next horizontal sync. pulse.

The output signal of the AND gate 344 is applied to the input of the AND gate 162 on the lead 160 and gates the designated object video such as to exclude images of objects of intensity similar to that of the designated object but physically separated therefrom.

The terminal 326 of the flip-flop 322 is coupled by a lead 507 to a summation circuit or network 504. As described previously, the duration of the signal at the terminal 326 is representative of the height of the designated image object above the horizontal cross hair position. The terminal 332 of the flip-flop 328 is coupled on a lead 506 to summation circuit 504, the duration of the signal on the terminal 332 being representative of the target height below the horizontal cross hair position. Summation circuit 504 provides an output signal, coupled to an integrator circuit 508 on a lead 509, that is a function of the sum of the two inputs and the integral of which is representative of the height of the designated image. One suitable configuration for the integrator 508 is as shown, whereby a conventional operational amplifier 510 utilizes a capacitor feed-back element 512 in a conventional integrator configuration and the output signal level of the amplifier 510 is clamped to ground potential by a conventional gate circuit 514 when gated by a positive pulse on a lead 516. This trigger pulse on the lead 516 is coincident in time with the trailing edge of the vertical sync. pulse and is provided from a circuit 396 which differentiates the vertical sync. pulse coupled from the sync. generator 706 on a lead 406 and generates a positive output pulse at the occurrence of the trailing edge of the vertical sync. pulse. The vertical sync. pulse on the lead 406 is differentiated by the interaction of a capacitor 398 and a resistor 400. The resulting negative voltage spike at a junction 402 is passed by diode 404 and then inverted by a conventional amplifier 407 and coupled to an output terminal 408.

A sample and hold circuit 518 samples the output potential of the integrator 508 at a junction 520 during the vertical sync. period and holds this value until the next vertical sync. sample pulse. The circuit 518 may be mechanized as shown, whereby a conventional gate 522 connects the junction 520 to a capacitor 524 only during the period the vertical sync. signal coupled to the gate 522 on a lead 526 is positive. The potential of the capacitor 524 is coupled through a resistor 528 to the input terminal of a conventional DC amplifier 530. It should be noted that sample and hold circuit 518 exhibits low charging impedance during the sample period and high discharging impedance during the holding period between gating pulses.

Figure 10:
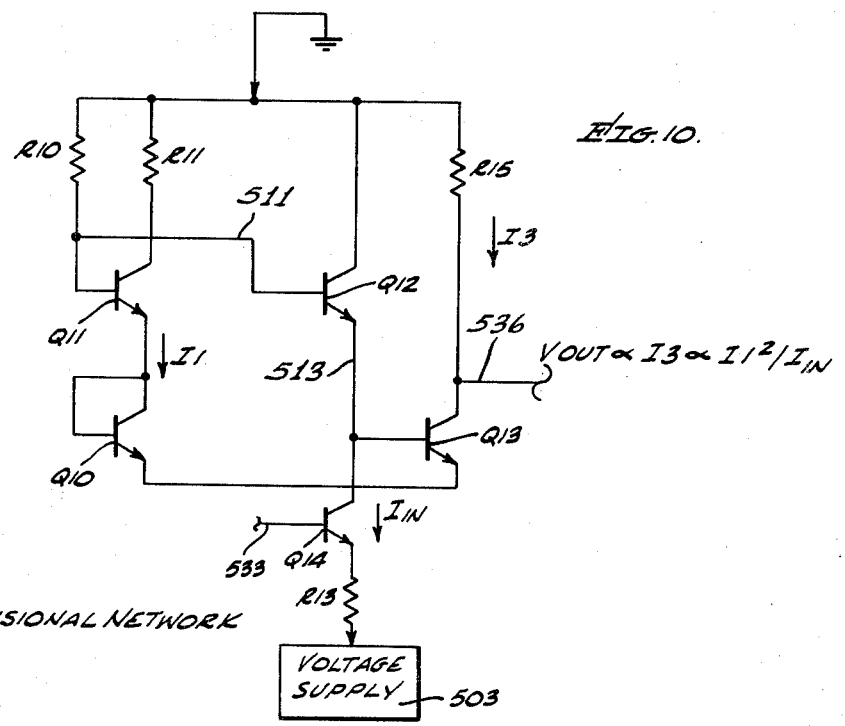
FIG. 10 is a schematic diagram of a suitable mechanization of the divisional network of FIG. 6.

The output signal of the DC amplifier 530 is coupled on a lead 531 to a first input terminal of a conventional differential amplifier 532. The second input signal to the differential amplifier 532 is coupled on a lead 535 from a DC voltage supply unit 505. The output signal of the differential amplifier 532 is shifted in voltage level from the signal on the lead 531 by a predetermined amount to provide DC voltage compatability with a divisional network 534. This output signal of the differential amplifier 532 is coupled to the input terminal of the divisional network 534 through a lead 533. A variety of divisional networks are well known in the art and an example of one such suitable circuit is shown in FIG. 10. Referring now to FIG. 10, Q10, Q11, Q12, Q13 and Q14 are NPN transistors, such as, for example, the 2N2914 type. Transistor Q10 is connected in a diode configuration with its base connected to its collector and its emitter coupled to the emitter of transistor Q13. The collector of transistor Q10 is connected to the emitter of transistor Q11 and the collector of transistor Q11 is coupled through resistor R11 to ground. The base of transistor Q11 is coupled to ground through a resistor R10 and to the base of transistor Q12 through a lead 511. The collector of transistor Q12 is connected to ground and the emitter of transistor Q12 is coupled to the base of transistor Q13 on a lead 513. The base of transistor Q13 is coupled to the collector of transistor Q14 which functions as a current source. The base of transistor Q14 is connected to the lead 533 of FIG. 6 and the emitter of transistor Q14 is coupled through resistor R13 to negative voltage supply 503. Still referring to FIG. 10, the current $I_{in}$ is approximately equal to the voltage across the resistor R13 divided by the resistance of R13. The transistor Q14 operates as a conventional emitter follower so that the voltage at its emitter is equal to the voltage on lead 533 less the base to emitter voltage of transistor Q14. The voltage level of the supply 505 of FIG. 6 is such that the shift in voltage of the signal at lead 531 through the differential amplifier 532 is equal to the negative voltage supply 503 plus the base to emitter voltage drop of the transistor Q14. Thus, the voltage drop across the resistor R13 is approximately equal to the signal amplitude on the lead 531, and the current $I_{in}$ is proportional to the height of the designated object image along the vertical cross hair. Referring again to FIG. 10, the collector of the transistor Q13 is coupled through the resistor R15 to ground. Also, the collector of transistor Q13 is connected to a lead 536 of FIG. 6.

The operation of the circuit of FIG. 10 is based on the exponential relationship that exists between the base-emitter voltage and emitter current of a transistor, i.e., $V_{BE} \alpha lnIe$ where: $V_{BE}$=Base to emitter voltage, and $ln(Ie)$=natural logarithm of the emitter current. From FIG. 10 it may be determined that $(-V_{BE}$ of Q10$)+(-V_{BE}$ of Q11$)$
$\qquad +(V_{BE}$ of Q12$)+(V_{BE}$ of Q13$)=0$ and therefore $(-lnIe_{10})+(-lnIe_{11})+(lnIe_{12})+(Ie_{13})=0$ As $Ie_{10}$ is the same as $Ie_{11}$ (designated I1) and $Ie_{12}$ is approximately the same as $I_{in}$ and $Ie_{13}$ is approximately the same as $I_3$, then $I_3$, which is proportional to $V_{out}$, is substantially equal to $I1^2/I_{in}.I1^2$ is a predetermined current value, so $V_{out}$ is proportional to a predetermined constant value divided by the input current. The output signal of divisional network 534 is therefore representative of a constant divided by the central height of the designated image and this output is coupled through a switch 537 to conventional gates or gating circuits 602 and 604 when the switch 537 is in the position shown. A predetermined constant current value is coupled to gates 602 and 604 from a conventional current source 539 when switch 537 is in the opposite position from that shown. The gate 602 is controlled by the output signal of an AND gate 606. One of the input signals to the AND gate 606 is image video supplied on a lead 608 from the terminal 164 of the AND gate 162. The other input to the AND gate 606, signal V2, is coupled on a lead 610 from the sync. generator 706. Signal V2 is at the high level state during odd-numbered horizontal readout scans and at the low level state during even-numbered horizontal scans. The output signal and the AND gate 606 controls the gate 602 and allows the current coupled through the switch 537 to pass only during the time the input signals are present simultaneously to the AND gate 606, which is coincident with the occurrence of incremental portions of the designated object image on odd-numbered horizontal readout scans. The output signal of the gate 602 at a terminal 612 is coupled through a mechanical switch 614 and a resistor 615 to a negative input terminal 616 of an integrator circuit 618.

The mechanization of the gate 604 may be similar to that described above for the gate 602. The signal at the terminal 164 of the AND gate 162 is coupled to one input of an AND gate 620 on a lead 622; the other input signal being $\overline{V2}$ coupled on a lead 624 from the sync. generator 706, $\overline{V2}$ being the complement of the signal V2 described above. The output signal of the AND gate 620 controls the gate 604 and allows the output current coupled through the switch 537 to pass only during the time the input signals are present simultaneously to the AND gate 620. The output signal of the gate 604 is coupled through a mechanical switch 626, a terminal 627 and a resistor 617 to a positive input terminal 628 of the integrator 618. The operation of the integrator 618 will first be described for the condition of switches 614, 626, 632 and 634 in the position shown.

The aforementioned switches may be interconnected such as by a mechanical linkage 636, for example. The switch 632 is coupled between terminal 627 and ground and switch 634 is coupled between a terminal 640 of a resistor 637 and a terminal 644 of a capacitor 638. One suitable mechanization of integrator 618 is as shown, whereby a conventional differential amplifier has the capacitor 638 connected between an input terminal 616 and an output terminal 630 and a capacitor 647 coupled between a second input terminal 628 and ground. The output potential of the integrator 618, at terminal 630, increases in the positive direction proportional to the integral of the current supplied to the input terminal 628 and in a negative direction proportional to the integral of the current supplied to the terminal 616. When switches 614, 626, 632 and 634 are in the opposite position from that shown, the resistor 637 is coupled across the terminals 630 and 644. The input terminal 616 is coupled through the resistor 615 and switch 614 to a lead 648 and the second input terminal 628 is grounded through resistor 617 and switch 632. In this configuration differential amplifier 646 operates substantially as a conventional constant multiplier operational amplifier and the output signal at the terminal 630 is proportional to the signal level on the lead 648.

The output signal of the integrator 618 is sampled and held by a circuit 650 that is similar to the circuit 518 described previously. The sample or gating signal for the circuit 650 is provided by the vertical sync. pulse coupled from the sync. generator 706 on a lead 653. The output signal of the sample and hold circuit 650 is processed by a conventional DC amplifier 652 and then coupled through the lead 376 to the comparator 374 to close the vertical cross hair position control loop, in that the potential on the lead 376 results in a repositioning of the vertical cross hair position 86 (FIG. 3) to coincide with the approximate horizontal center of the target.

The signal $\overline{V1}$, described previously, is provided to a differentiating circuit 410 through the lead 412. Differentiating circuit 410, identical to circuit 352 described previously, produces output pulses, coincident with the leading edges of the signal $\overline{V1}$. The output pulses are coupled to a flip-flop 414 that is set to the high level state by the output signal of circuit 396 which was previously described and re-set to the low level state by the output signal of the circuit 410. The output signal of flip-flop 414 at a terminal 416 is positive during the first two horizontal readout scans of the transducer screen during each vertical scan sequence. The terminal 416 is coupled to an AND gate 538 on a lead 540, and the terminal 164 of the AND gate 162 is coupled to the AND gate 538 on a lead 542. The output signals of AND gate 538 are representative of the width of the designated object image at its center.

The output current pulses of the AND gate 538 are processed by an integrator 544, a sample and hold circuit 546, an amplifier 548, divisional network 550 and switch 541 in an identical manner to that described previously for circuits 508, 518, 530, 534 and switch 537, respectively. The output signal of the switch 541 is processed by gate circuits 654 and 656 in the same manner as described for gates 602 and 604 previously. The gate 654 is controlled by the output signal of an AND gate 658 where the inputs to the AND gate 658 are the signal at the terminal 164 of the AND gate 162 and the signal V1 from sync. generator 706 coupled through lead 660. The gate 656 is controlled by the output of the AND gate 662 where the inputs to this AND gate are the signals at terminal 164 of the AND gate 162 and the signal $\overline{V1}$ from sync. generator 706 coupled by lead 664. The output of the gate 654 is coupled to a terminal 666 of a switch 668 and the output signal of the switch 668 is coupled through a resistor 669 to an input terminal 670 of an integrator circuit 672. The output signal of the gate circuit 656 is coupled through a switch 674 and a resistor 675 to a second input of the integrator 672 at a terminal 677. A switch 678, shown in the open position, connects the terminal 676 to ground when switch 678 is closed. A second terminal 682 of switch 668 couples the terminal 670 through resistor 669 to a lead 684 when switch 668 is closed. The input signals to the terminals 670 and 677 are processed by the integrator 672, sample and hold circuit 686 and amplifier 688 in an identical manner to that described previously for circuits 618, 650 and 652 respectively.

The output of amplifier 688 is coupled on a lead 714 to the vertical deflection generator 704 which closes the vertical control loop, in that the potential applied to the lead 714 results in a repositioning of the horizontal cross hair position and hence the start of the vertical scan readout sequence until the horizontal cross hair position coincides with the approximate vertical center of the designated object image.

The control assembly 20 is composed of two potentiometers 22 and 24 connected between suitable sources of positive and negative voltages as shown. The wiper element of potentiometer 22 is coupled to the lead 684 and the wiper of potentiometer 24 to the lead 648. The potential on the leads 648 and 684 control the output voltages of the integrators 618 and 672 when switches 614 and 668 are in the manual position (opposite position to that shown). The wiper position of the potentiometers 22 and 24 are independently operator variable, for example.

The video output signal at the terminal 54 of the TV camera 50 is coupled through a lead 82 to an input terminal of the TV monitor 80. Intensity pulses, which are coincident with the boundary of the designated object image, are coupled from the output terminal of the differentiating circuit 352 to an input of monitor 80 on a lead 83. Pulses which are representative of the vertical cross hair position relative to the display are coupled to an input terminal of monitor 80 from the output of differentiating circuit 370 on a lead 87 and the horizontal cross hair position intensity pulses are supplied to an input of monitor 80 on a lead 89 from the output terminal 416 of flip-flop 414. The vertical position of the display write beam is controlled by the vertical deflection signal coupled to an input terminal of TV monitor 80 on a lead 90 from the vertical deflection generator 704. The horizontal position of the display write beam is controlled by the horizontal deflection signal coupled to an input terminal of monitor 80 on a lead 92 from the horizontal deflection generator 702.

The mechanization of the horizontal deflection generator 702, vertical deflection generator 704 and the synchronization generator 706 will be better understood by referring to FIGS. 7 and 8 which show block and schematic diagrams of the above-mentioned units. A conventional free-running multi-vibrator 701 generates the signals V2 and $\overline{V2}$ shown by waveforms 820 and 822 respectively of FIG. 12. Signal V2 is coupled through a lead 703 to a high pass filter 705 which may include a capacitor 707 in series with the input signal and a resistor 709 connected between the output of the capacitor 707 and ground as shown in FIG. 8. The output signal of the filter 705 is coupled through a lead 711 to a conventional integrator 713 which may be mechanized similarly to that shown for the integrator 508 of FIG. 6. The output signal of the integrator 713 after amplification by a conventional DC high voltage amplifier 715 is applied to the leads 56, 92 and 378 of FIG. 4. The signal on leads 56, 92 and 378 is the horizontal deflection signal discussed previously and as shown by a waveform 818 of FIG. 12.

The signal $\overline{V2}$ is coupled from the multivibrator 701 through a lead 717 to a differentiating network 719 which may be the same as the circuit 352 previously described. The output signal of the network 719 is composed of positive pulses coincident with the leading edges of the signal $\overline{V2}$ and these signals are coupled through a lead 721 to a summation circuit or network 723. The output of a conventional AND gate 732 is coupled to a second input of the summation network 723 through a lead 734. The operation of summation network 723 is the same as described previously for circuit 504 and the output terminal of the circuit 723 is connected by a lead 725 to the input of an integrator 727 of the vertical deflection generator 704. The integrator 727 may be of the type described for the circuit 508 and its output potential is clamped, to the zero reference level, for example, at the occurrence of the vertical sync. pulse coupled through a lead 710. The output signal of integrator 727 is a stair-step type signal (similar to that of waveform 812 of FIG. 12) that is processed by a conventional DC amplifier 731 and then applied through leads 733 and 735 respectively to conventional gates or gating circuits 737 and 739. The gates 737 and 739 are controlled by signals coupled through leads 741 and 743 respectively. The output signals of the gate 737 is inverted by a conventional amplifier 745 and then connected to an input terminal of a summation network 747 through a lead 749. The output signal of the gate 739 is connected to a second input terminal of the summation network 747 on a lead 751, and the signal $P_v$ is coupled to a third input terminal of the network 747 on the lead 714. The summation circuit 747 combines the input signals in the same manner as described previously for circuit 504 and its output signal, after amplification by a conventional high voltage amplifier 753 is coupled to the leads 58 and 90.

The stairstep type signal (similar to that of waveform 812 of FIG. 12) at the output terminal of the amplifier 731 is coupled on a lead 755 to the input terminals of summation networks 757 and 759. The signal $P_v$ is coupled through the lead 720 to a second input terminal of summation network 759 and to the input terminal of a conventional amplifier 760. The signal $P_v$ is inverted by the conventional amplifier 760 and coupled to a second input terminal of summation network 757. The output signal of summation network 757 is compared to a predetermined reference potential, supplied by a voltage supply 768, in a comparator circuit 761. The comparator 761 may be of the type described for circuit 150 previously and its output signal V4 as shown by a waveform 806 of FIG. 11 is at the high level state until the input signal on the lead 763 is less positive than the reference potential of voltage supply 768. The reference supply potential is representative of the occurrence of the lower limit of the raster of the TV camera 50. In a similar manner the output signal of the summation network 759 is coupled to a comparator 765 on a lead 767 and therein compared with a supply voltage provided by supply 769, the voltage of which is representative of the upper limit of the raster of the TV camera 50. Comparator 765 operates in a manner similar to that of the circuit 152 previously described and its output signal V3 is at the high level state until the upper limit of the scanning raster has been reached. The signal V3 is shown by a waveform 804 of FIG. 11. The signals V3 and V4 are inverted by conventional inverter circuits 771 and 773 respectively to form signals $\overline{V3}$ and $\overline{V4}$ which are the complements of the signals V3 and V4 respectively. Signals $\overline{V3}$ and $\overline{V4}$ are coupled to the input terminals of a conventional OR gate 775 and to the input terminals of an AND gate 777. The output signal of the AND gate 777 is coupled to a conventional monostable multivibrator 779 on a lead 781. The output of the multivibrator 779 that is connected to a lead 783 is at the high level state for some time period, for example 0.6 millisecond, after a trigger is present at the lead 781. The output signal of circuit 779 connected to a lead 785 is the complement of the signal on the lead 783. This signal on lead 783 sets a conventional RS type flip-flop circuit 787 which is reset by signals coupled through a lead 789 from an AND gate 791. The output of flip-flop 787 is the vertical sync. signal shown by a waveform 802 of FIG. 11 and is coupled on a lead 710 to the integrator 727. The function of the flip-flop 787 and the AND gate 791 is to insure that the vertical sync. signal (waveform 802, FIG. 11) terminates in the proper sequence relative to the timing signals V1 and V2.

The signal V2 is coupled on a lead 793 to a differentiating network 795, similar to the network 719, and provides an output pulse coincident with the leading edges of the signal V2. These output pulses of network 795 are coupled on leads 797 and 799 to a flip-flop circuit 730 and to the AND gate 732 respectively. The flip-flop 730 is the conventional toggle type whose output signals V1 and $\overline{V1}$ change state every time a positive pulse is coupled on lead 797. The signals V1 and $\overline{V1}$ were explained previously and are as shown by waveforms 814 and 816 respectively of FIG. 12. The output of the OR gate 775 is connected to a second input of the AND gate 732 through a lead 750 and therefore the high level input pulses on the lead 734 are present at the occurrence of the leading edge of the signal V2 if the upper or lower extreme of the scan raster has been reached.

The signals $\overline{V1}$ and V4 are connected to the input terminal of a conventional AND gate 736 and the output signal is coupled to an input terminal of an OR gate 740 through a lead 738. $\overline{V3}$ is the other input signal to the OR gate 740 and the output pulse is coupled on a lead 741 to the gate 737. In a similar manner, signals V1 and V3 are coupled to an AND gate 742 and the output signal on a lead 744 is supplied to an input terminal of an OR gate 746. The second input signal to OR gate 746 is the signal $\overline{V4}$ and the output signal on a lead 743 is coupled to the gate circuit 739.

The signal on the lead 785 is coupled to an input terminal of the AND gate 791 as are signals V2 and V1. The output signal of the AND gate 791 on the lead 789 resets the flip-flop 787. Also, the signal V2 is coupled on a lead 752 to differentiating circuit 754 which may be of a type similar to that described previously for circuit 370, and the output signal on a lead 756 is the horizontal sync. pulse shown by waveform 810 of FIG. 12.

The function of the output signal of the gate 732 is to double the pulse rate to integrator 727 if either the upper or the lower limit of the scan raster has been reached. In such an event the logic, resulting from the mechanization of gates 736, 740, 742 and 746, enables the proper gate 737 or 739 so as to control the vertical position of the scan beam on the portion of the raster not yet scanned in a continuous scan pattern rather than alternately above and below the position of $P_v$ as previously described.

Figure 12:
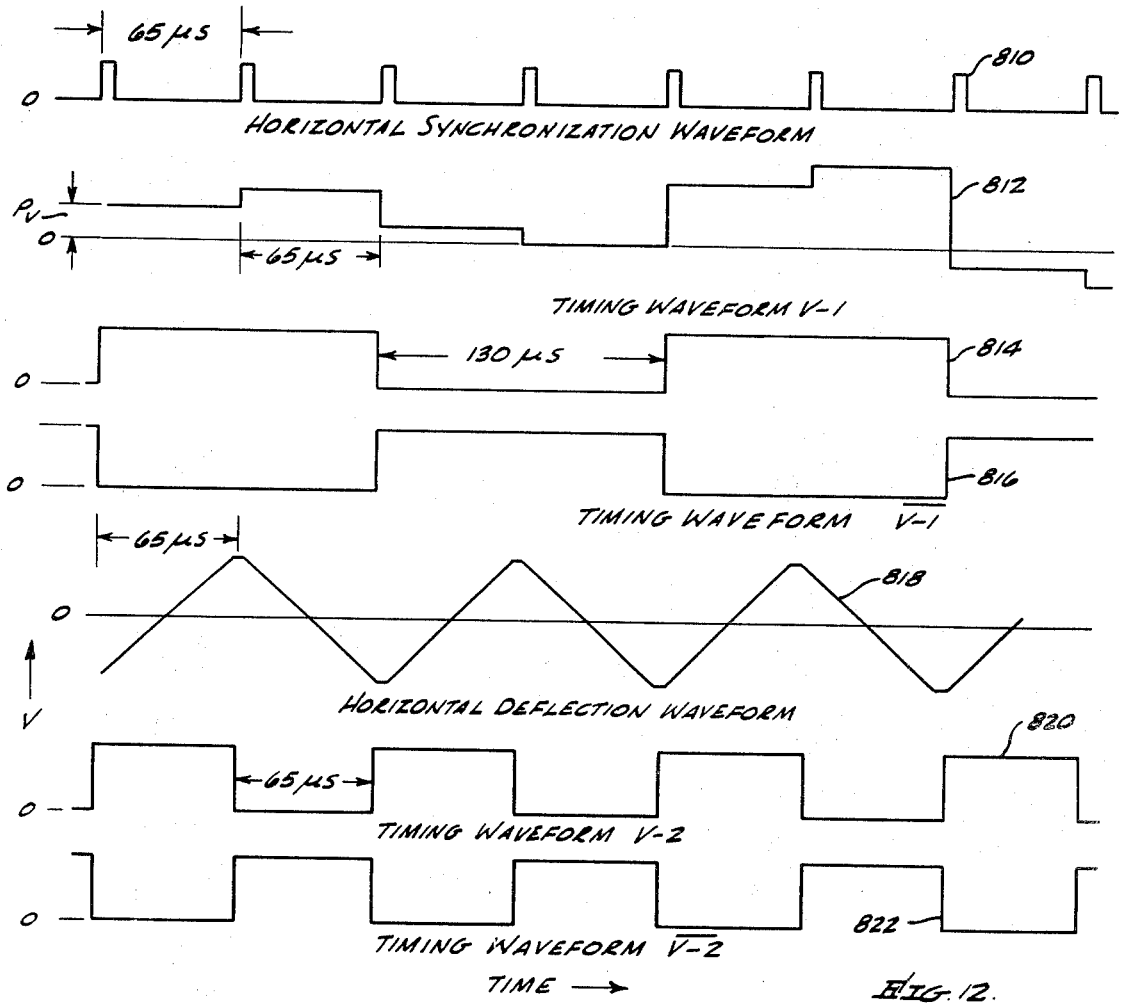

The readout electron beam scan pattern of the TV camera 50, as well as the basic timing and processing mechanization of the system in accordance with the principles of the invention, will be better understood from the following discussion of the waveforms of FIGS. 11, 12 and 13 considered in conjunction with the system of FIGS. 4, 5 and 6. The time values shown in FIGS. 11, 12 and 13 are examples of one time base, however, it will be understood that other timing values may be selected to meet any particular systems requirements.

The basic timing for the system is provided by the vertical sync. pulses shown by a waveform 802 of FIG. 11, developed by the sync. generator 706 on a lead 710 and the horizontal sync. pulses, shown by a waveform 810 of FIG. 12, developed by the sync. generator 706 on a lead 712. The vertical deflection generator 704, in response to timing signals provided by the sync. generator 706 and the potential coupled on the lead 714, develops the vertical deflection signal supplied to the TV camera 50 on the lead 58. This vertical deflection signal is shown by waveforms 808 of FIG. 11 and 812 of FIG. 12. The waveform 808 of FIG. 11 shows the envelope of the vertical deflection waveform which begins at the occurrence of the trailing edge of the vertical sync. pulse and is reset at the occurrence of the leading edge of the following vertical sync. pulse. It is noted that the vertical deflection waveform 808 starts at a potential $P_v$ which is the voltage analog of the approximate vertical position of the center of the designated object on the transducer screen as explained previously relative to FIG. 4. The waveform 812 of FIG. 12 is a portion of the vertical deflection waveform 808 (FIG. 11) with an expanded time scale. It depicts the voltage vs. time sequence of the vertical deflection signal starting at $P_V$ and varying in steps each horizontal sync. period and alternating above and below $P_V$ each pair of horizontal sync. pulses. The waveform of the signal V1 coupled from sync. generator 706 on lead 336 is shown by waveform 814 of FIG. 12. As discussed previously, waveform V1 is at the high level state during the time the voltage of the vertical deflection signal is equal to or greater than $P_V$ and at the low level state during the time the vertical deflection signal is less than $P_V$. So, signal V1 is positive while the readout scan is above the approximate center of the designated object image and zero potential while the readout scan is below this image center position. The signal V1 coupled from sync. generator 706 on lead 340 is shown by wavefrom 816 of FIG. 12. As shown by the wavefrom 816, the signal $\overline{V1}$ is the complement of the signal V1.

The output signal from the horizontal deflection generator 702 on the lead 56 is shown by a waveform 818 of FIG. 12. In response to this deflection signal, the readout screen of TV camera 50 is scanned from one horizontal extreme of the transducer screen to the opposite side and back to the horizontal starting posititon as waveform 818 goes through one voltage-time cycle. The signal V2 coupled from the sync. generator 706 on the lead 610, is shown by a waveform 820 of FIG. 12. The waveform V2 is at the high level state during the time period that the horizontal deflection signal of the waveform 818 has a positive slope and at the low level state during the period that the horizontal deflection signal slope has a negative slope. So, the signal V2 is positive while the readout beam is traveling from left to right and zero while the readout beam is traveling from right to left, for example. Signal $\overline{V2}$, of a waveform 822 of FIG. 12, is coupled from the sync. generator 706 on the lead 624 and is the complement of the signal V2.

The video output signal at terminal 54 of TV camera 50 is representative of the relative energy intensity of the portion of the transducer screen being readout by the electron beam. A waveform 830 of FIG. 13 shows the voltage vs. time relationship of this video signal for a few horizontal readout scans. In waveform 830 the occurrence of the designated object is indicated by the letter D.

The signals at the output terminals of comparators 150 and 152, as shown by a waveform 832 of FIG. 13, are composed of constant voltage amplitude pulses and both output signals are positive only during the time period that the potential level of the TV camera video is within a predetermined voltage range of the potential of the designated object image video. Pulses which coincide with the occurrence of the designated object image are indicated by the letter D in waveform 832.

The center pulses at the output of the differentiating circuit 370 are shown in a waveform 834 of FIG. 13, these pulses being coincident in time with the vertical cross hair position on the display.

The output signal at the terminal 164 of the AND gate 162 is a series of constant amplitude pulses. The time duration of these image video pulses are representative of increments of the inter-intensity contour of the designated object image area. The voltage vs. time characteristic of this signal at the terminal 164 is shown in a waveform 836 of FIG. 13.

The system of FIGS. 4, 5 and 6 has two modes of operation, manual (acquisition) and automatic (track). The operation of the system is initiated in the acquisition mode which will be discussed with reference to FIGS. 3 and 6. An operator, while observing the display tube screen 81 shown in FIG. 3 selects an object to be tracked by superimposing the intersection of the vertical 86 and horizontal 84 cross hairs upon the designated object image 52 on TV monitor 80. These cross hairs are manually positionable by controls 22 and 24 (FIG. 6) when linkage 636 is operator activated such that the switches of integrator 600 are in the opposite position from that shown in FIG. 6. In this acquisition mode the output signals $P_H$ and $P_V$ of integrator 600 are determined by the position of controls 22 and 24. As shown in FIG. 3 the signals $P_V$ and $P_H$ are the voltage analogs of the positions of the horizontal and vertical cross hairs, respectively, relative to the center of the display tube screen.

This relationship of the signals $P_V$ and $P_H$ and the display cross hair positions may be understood by referring to FIGS. 2 as well as 3, 4, 5 and 6. As will be recalled, the signal $P_V$ is summed with the vertical deflection voltage in the deflection generator 704 (FIG. 4) to determine the posititon on the transducer screen of the first horizontal readout scan of each vertical frame. Also, it is noted that the readout scan of TV camera 50 is synchronized with the write scan beam of TV monitor 80 since both scans are controlled by the same pair of deflection signals. The flip-flop 414 of FIG. 5 provides a positive output signal (displayed as the horizontal cross hair 84 in FIG. 3) to TV monitor 80 during the time periods of the first two horizontal readout scans of each vertical frame. Therefore, the signal $P_V$ determines the horizontal display cross hair position on the display tube screen. Also, as discussed previously the differentiator circuit 370 of FIG. 5 produces positive pulses on the lead 87 at the time when the horizontal deflection voltage (coupled on the lead 56 to TV camera 50 and on the lead 92 to the TV monitor 80) is equal to the value of the signal $P_H$. These positive pulses on lead 87 are displayed by TV monitor 80 as the vertical cross hair 86 (FIG. 3), and so its position is a function of $P_H$.

After the operator has designated the object to be tracked by the acquisition procedure just described the automatic (track) mode is initiated by manual activating linkage 636 (FIG. 6) such that the switches of the integrator 600 are in the positions shown in FIG. 6. In this mode of operation the intersection of the display cross hairs automatically tracks the approximate center of the designated image on the monitor display of FIG. 3 and on the voltages $P_V$ and $P_H$ are indicative of the vertical and horizontal center respectively of the image relative to the center of display and transducer screens. The vertical and horizontal cross hair intersect at the approximate center of the image in response to the variations of $P_V$ and $P_H$ and their position is updated each frame in response to the vertical sync. pulses applied to circuits 650 and 686.

Figure 14:
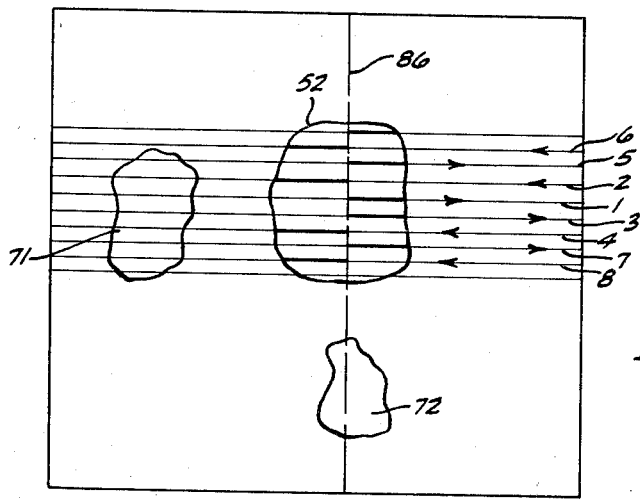
FIG. 14 is a diagram depicting an expanded portion of the readout scan pattern of a TV camera that may be utilized in the system of FIG. 1 for explaining the operation of the system in accordance with the invention.

The unique transducer scan and logic implementation that is utilized by the system in accordance with this invention to automatically track the relative angular position of the designated object will now be described by reference to FIG. 14 as well as to FIGS. 4, 5 and 6. In the interest of clarity, FIG. 14 shows a greatly expanded portion of the readout pattern of the transducer screen of TV camera 50. Although for clarity only 8 horizontal readout scans are shown and the spacing between scans is greatly exaggerated relative to the image size, it is to be understood that a realistic object image may include hundreds of horizontal readout scans. Included in FIG. 14 is the image of the object designated to be tracked as well as undesirable object images 71 and 72 (clutter). Also, the relative position of the vertical cross hair 86 is shown in FIG. 14 as a reference for the relationship to be developed between the logic gating of the circuit 300 and the transducer scan of TV camera 50.

The system of FIGS. 4, 5 and 6 scans the transducer screen in the sequential manner indicated by the scan pattern numbering in FIG. 14, resulting in the processor 100 of FIG. 4 developing constant voltage image signals at the terminal 164. It will be shown that the time duration of these signals are proportional to the length of the darkened horizontal bars of FIG. 14. Thus, it may be seen that the constant voltage image signals are present only during the portion of the scan from the occurrence of the vertical cross hair 86 to the perimeter of the designated object image. This is a very significant feature for the rejection of clutter and noise signals as indicated by the images 71 and 72 which may be of the same relative intensity as the image 52. It will be shown that the clutter image 71 is not processed on odd-numbered scans because the processor 100 is not gated on until the occurrence of the vertical cross hair 86 and the image 71 is not processed on even-numbered scans because the processor is gated off at the perimeter of the image 52 for the remainder of the horizontal scan period. Also, the clutter image 72 will not be processed because the processor 100 is gated off during the bottom portion of the transducer scan after the lower vertical edge of the designated image is detected.

Referring now to FIGS. 4 and 5, the constant voltage image signals are developed in processor 100 in response to TV camera 50. The relative intensity of the designated image at the time of the intersection of the display cross hairs is sampled and held by the circuit 122 and the camera video is adjusted by the clamp circuit 130 so that the designated image video intensity level is in the center of the discrimination window formed by comparator 150 and 152. Therefore, both signals at the output terminal of the comparators (lead 156 and lead 158) are positive only for images of approximately the same intensity level as the designated image. It is the signal on the lead 160 which contains the logic required to insure that the AND circuit 162 does not process clutter images of the same intensity as the designated image, that is clutter images such as 71 and 72 of FIG. 14. This signal on the lead 160 is positive only during the scan period after the vertical cross hair has been reached until the first intensity boundary has been crossed on each horizontal scan. Even then this signal can be positive only if a lower edge of the designated image at the vertical cross hair has not occurred when scanning below the $P_v$ position or an upper edge of the designated image at the vertical cross hair has not occurred when above the $P_v$ position.

One main function of the logic circuit 300 and in particular the AND gate 344 is to develop this logic signal on the lead 160. Since the output signal of the AND gate 344 is positive only when all 3 of its input signals are positive at the same time, it will be shown that the conditions described previously for the signal on the lead 160 are met only when all 3 inputs to AND gate 344 are positive simultaneously. It can be determined from FIG. 5 that the output signal of the flip-flop 348 is set to the positive voltage level by the horizontal sync. pulse at the start of each horizontal scan and reset to the zero level at the trailing edge of the signal on the lead 168, which occurs in time coincident with the trailing edge of the constant voltage image signal. Thus, the signal at the output terminal of the flip-flop 348 is positive from the start of each horizontal scan until the trailing edge of the designated object image. The input signal to the AND gate 344 on the lead 346 is positive when either or both of the output signals of the AND gate 334 or 338 are positive. Considering AND gate 334 first, its input signal on the lead 336, V1, is positive when the readout scan is above the $P_v$ position and the input signal on the lead 326 is positive when the flip-flop 322 is at the high level state. Flip-flop 322 is set to the high level state by the vertical sync. pulse at the start of each vertical frame and remains at the high level state until reset to the low level by a positive pulse coupled on the lead 316 from AND gate 302. It may be seen from the mechanization of the AND gate 302 that a positive output will occur only if during the time the readout scan is above the $P_v$ position (due to input signal V1 on the lead 314) that there is an absence of image video (due to the signal on the lead 168 which is the complement of the constant voltage image signal) at the occurrence of the vertical cross hair position (due to the center pulses coupled from differentiator circuit 370 on the lead 310). Consequently, the signal at terminal 326 of the flip-flop 322 is positive from the start of each vertical readout frame until the top of the center of the designated object along the vertical cross hair position. The signal at the input of AND gate 334 is positive during portions of this same period when the readout scan is above the $P_v$ position (due to signal V1 coupled on lead 336). The mechanization of the AND gate 338 is similar to that described for the gate 334 except that gate 338 determines the same function relative to the occurrence of the bottom of the object image. Therefore, the signal on lead 346 is positive from the start of each vertical frame until the top of the image along the vertical cross hair has been reached while the scan is above the $P_v$ position and also is positive from the start of each vertical frame until the bottom of the image along the vertical cross hair while the scan is below the $P_v$. The third input signal to the AND gate 344 is coupled from the flip-flop 364 which is set to the high level state by the center pulses (occurrence of the vertical cross hair position) each horizontal scan and is reset to the low level state by the occurrence of the horizontal sync. pulses, coupled on the lead 366, at the start of the next horizontal scan. The output signal of the AND gate 344 on lead 160 will therefore have the characteristics described previously.

Referring again to FIG. 14 as well as FIGS. 4, 5 and 6 it may be seen that if the constant amplitude image signals developed during odd-numbered scans (1, 3, 5, 7, etc.) were gated into one input terminal of a positive-negative integrator (integrator 618, for example) and even-numbered scan pulses (2, 4, 6, 8, etc.) were gated into a second input terminal of the same positive-negative integrator, with the integrator output voltage being sampled during the time period between vertical frames, then the change of this output voltage would be proportional to the relative position of the vertical cross hair 86 relative to the horizontal center and the designated object image. Also, it is to be noted that due to the scan time sequence, the integrator would only have to process error signals proportional to the offset of the vertical cross hair from the image cross hair center rather than to compare signals which are proportional to the areas on each side of the vertical cross hair as in some prior systems. However, in processing these error signals for a constant offset of the vertical cross hair position the integrator output voltage change would be a function of the object image height (as is the case when switches 537 and 541 are in the opposite position from that shown in FIG. 6). This, of course, is due to the fact that for a given cross hair position offset a constant voltage would be added to the integrator output level each pair of horizontal scans. The condition just described is undesirable when tracking targets of large image size since the accuracy and stability of the vertical cross hair position, that is, the accumulated voltage, would fluctuate as a function of target height. The system in accordance with the principles of this invention substantially eliminates this problem by the novel mechanization shown in FIGS. 5 and 6.

It will be recalled that the time duration of the positive signal at the terminal 326 of the flip-flop 322 is representative of the height of the designated object image above the $P_v$ position along with the vertical cross hair and that the time duration of the positive signal at the terminal 332 of the flip-flop 328 is representative of the height of the designated image below the $P_v$ position. When these two signals are summed by the summation network 504 and then integrated by the integrator 508, the voltage level at the output of the sample and hold circuit 518 is representatve of the height along the vertical cross hair of the designated image. The height signal is divided into a predetermined constant value by the divisional network 534 and the resulting signal, which is the function of the inverse object image height, is then gated by the constant voltage image signals into positive-negative integrator 618. The gating sequence of the output signal of the divisional network 534 by the constant voltage image signals is as described previously but now the change in the integrator voltage level is due to the offset position of the vertical cross hair and substantially independent of the image height. Thus, the value of $P_H$ is up-dated as just described resulting in a corrected position of the vertical cross hair (through the operation of circuits 374, 370 and 364) for the next vertical frame.

The value of the signal $P_v$ and thus the position of the horizontal cross hair and the start position of the vertical frame is corrected (up-dated) in a manner similar to those described for the signal $P_H$. The output of the flip-flop 414, it will be recalled, is positive during the first two horizontal scans of each vertical frame, which is coincident in time with the occurrence of the horizontal cross hair. This signal coupled on the lead 540 and constant voltage image signals coupled on the lead 542 are processed by the AND gate 538 such that the integral of the output signal is representative of the width of the designated object image along the horizontal cross hair. This signal is divided into a predetermined constant value by divisional network 550 and then gated, integrated and processed by circuits of the integrator unit 600 in a manner similar to that described previously for the $P_H$ channel. However, it should be noted that the output of the divisional network 550 is gated by the constant voltage image signals such that the signal is coupled to one input terminal of the positive-negative integrator during even pairs of horizontal scans (1, 2—5, 6—etc.) and to the other input terminal on odd pairs of scans (3, 4—7, 8 etc.). Again, the change in the integrator level will be function of the offset of the horizontal cross hair from the vertical center of the object image and substantially independent of image width. Also, the integrator need only accumulate incremental error signals proportional to the horizontal cross hair offset position and not proportional to the area above and below the horizontal cross hairs as in some prior systems. The output voltage of the integrator 672 is processed by circuits 686 and 688 as shown in FIG. 6 and the resulting signal $P_v$ repositions at the end of each frame the vertical deflection voltage produced by the generator 704 as described previously and therefore the starting position of the vertical readout scan and the horizontal cross hair position.

Figure 15:
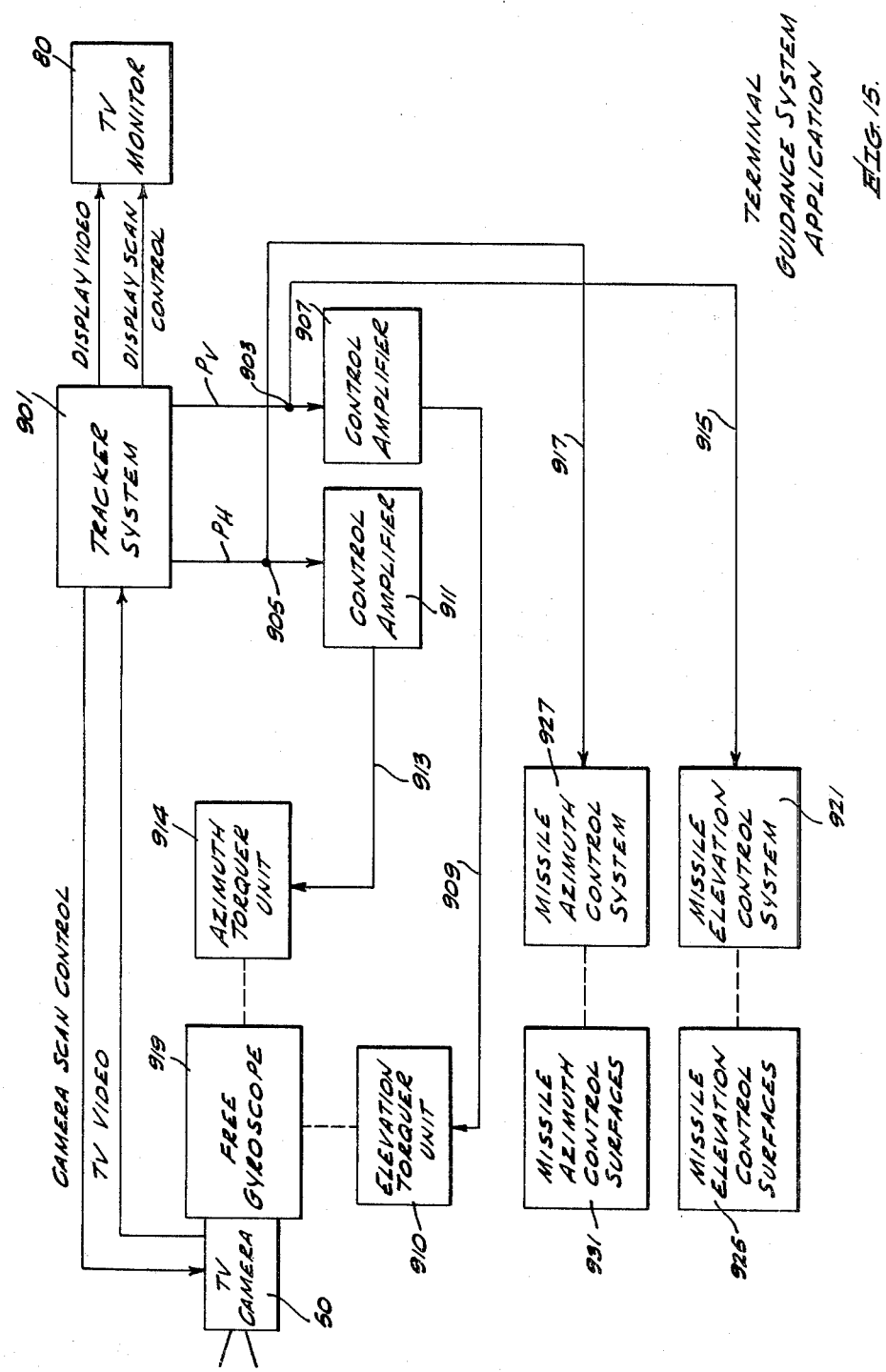
FIG. 15 is a functional block diagram showing a guidance system incorporating the principles in accordance with this invention.

FIG. 15 shows a homing missile terminal guidance application in accordance with the principles of the invention. The operator may select the object to be tracked by utilizing the acquisition and track procedure described previously. The tracking system of FIG. 1, exclusive of TV camera 50 and TV monitor 80, is designated unit 901 in FIG. 15. In response to the video signals of TV camera 50, tracker unit 901, provides output voltage $P_v$ and $P_H$ at terminals 903 and 905 which represent the approximate vertical and horizontal center, respectively of the designated object image relative to the TV camera field of view. These signals $P_v$ and $P_H$ may be utilized by any suitable conventional missile terminal guidance system to direct the flight path of the missile after launch. For example, referring to FIG. 15, the elevation tracker reference potential $P_v$ at the terminal 903 is processed by a conventional electronic servomechanism control amplifier 907 and then coupled on a lead 909 to a conventional gyroscope torque unit 910. The free gyroscope unit 919 is mechanically precessed by the action of the torque unit 910. The gyroscope unit 919 may be of any suitable conventional type such as that shown in Figure 10–5(a) page 272 of the text entitled, "Guided Missile Engineering" published by McGraw-Hill Book Company, New York. The force exerted by the torquer unit 910 is such as to precess the gyroscope in the elevation angular direction thereby changing the field of view of the TV camera 50, which is physically attached to the gyroscope unit 919. The resulting angular motion of the TV camera tends to point the optical axis more towards the vertical position of the designated object, therefore resulting in a decrease of the elevation tracker reference potential at the terminal 903.

In a similar manner the azimuth tracker reference potential $P_H$ at a terminal 905 is processed by a conventional electronic servomechanism control amplifier 911 and is then coupled on a lead 913 to a conventional gyroscope torque unit 914. The force exerted by the torquer unit 914 is such as to precess the glyscope 919 in the azimuth angular direction and thereby change the field of view of the TV camera 50. The resulting angular motion of the TV camera tends to point the optical axis more towards the horizontal position of the designated object, resulting in a decrease in the azimuth tracker reference potential at the terminal 905.

Also, the elevation tracker reference potential at the terminal 903, $P_v$ is coupled on a lead 915 to a suitable conventional missile elevation control system 921. In response to the signal $P_v$ the system 921 mechanically drives the missile elevation control surfaces 925. This outer servo control loop, which is closed by control surfaces 925, tends to null the line of signal angle of the designated object with respect to the missile velocity vector.

In a similar manner, the tracker azimuth reference potential at the terminal 905 is coupled on a lead 917 to a suitable missile azimuth control system 927 which drives the missile azimuth control surfaces 931 and thereby closes the outer servo loop in the horizontal direction.

It is to be noted that the frequency response of the servo loop comprising the TV camera 50 and tracker system 901 is usually much higher than that of the control loop for positioning the camera 50 and gyroscope 919 in combination and that the servo loop controlling the missile steering surfaces conventionally possesses the longest time response.

Although but one embodiment of this invention has been described herein, it will be appreciated by those skilled in the art that other arrangements may be utilized in accordance with the principles of this invention. For example, TV camera 50 of FIG. 4 is a conventional vidicon unit with electro-static deflection plates; however, since the principles of this invention are unaffected by the spectral band of the sensor element, any suitable sensor, for example, infra-red or ultra-violet types may be utilized. Although in the illustrated system the area center of the image is tracked in two dimensions, it is to be understood that the principles of the invention include systems operating in one or two dimensions, and systems exhibiting tracking response dependent on, as well as independent of, the image size being tracked. It is noted that the term quadrant is to mean any of the four parts into which a plane is divided, and the term is not to be limited to the condition in which the areas of all quadrants are exactly equal to each other. Also, the term space is to include any portion of the atmosphere or of space and the term sequential differential summation means the accumulation of the difference between selected signals which are developed in a predetermined time sequence.

Thus, there has ben described a tracking system that determines the location of a designated object relative to the field-of-view of a sensor. The system reduces circuitry dynamic range requirements by an incremental area comparison mechanization and produces tracking accuracy and stability essentially independent of the size of the image tracked. Tracking performance is enhanced by utilizing an image signal gating system that is adaptive to the inter-intensity contour of the object image tracked.

What is claimed is:

1. A system for determining the angular position of the approximate center of a designated object in space in response to energy received therefrom comprising:

transducer means responsive to said received energy for sequentially developing signals having time durations representative of the size of object area increments in selected quadrants of said designated object, linear processor means coupled to said transducer means for respectively dividing said object area increment signals by functions of two transverse dimensions of the designated object to respectively provide first and second incremental linear dimension signals, and integrator means coupled to said processor means for determining the angular position of the center of said object by sequentially summing the differences between sequences of selected first and second linear dimension signals.

2. Apparatus for determining the angular position of the approximate center of a designated object in space in response to received energy comprising:

transducer means responsive to said received energy for sequentially developing signals representative of object area increments in selected quadrants in space for objects of substantially the same relative intensity as said designated object, control means coupled to said transducer means for developing control signals which designate the object to be tracked, logic means coupled to said transducer means and said control means and responsive to said object area increment signals and said control signals for developing signals representative of object area increments of only said designated object, and position determining means coupled to said logic means and including integrator means responsive to said signals representative of object area increments of said designated object, for determining the angular position in space of the approximate center of said designated object by sequentially summing the difference between first and second sequences of selected object area increment signals.

3. The apparatus of claim 2 in which said position determining means includes:

linear processor means coupled to said logic means, said transducer means and to said integrator means for respectively dividing said designated object area incremental signals by functions of first and second transverse dimensions of the designated object to respectively provide first and second incremental linear dimension signals, and in which said integrator means determines the relative angular position of the approximate center of said designated object by sequentially summing the differences between first and second sequences of selected ones of said linear dimension signals.

4. A system for tracking the angular position of the center of a designated object within a field of view of a selected area comprising:

receiver means, including an image plane sensor having a surface, for forming images of objects on said sensor surface in response to energy received from said objects, readout means coupled to said receiver means for developing video signals representative of the relative intensity of said images on said sensor surface, video processor means, coupled to said readout means, for sequentially developing signals representative of object image area increments, in selected fourth parts of said image plane sensor surface, for objects of substantially the same intensity as a designated object, control means coupled to said readout means, for developing control signals which designate the object to be tracked, logic means, coupled to said control means and video processor means and responding to said control signals and said object image area signals, for developing signals representative of object area increments of only the designated object, and integrator means, coupled to said logic means said readout means and responsive to said signals representative of object image area increments of said designated object, for determining the relative angular position of the center of said designated object by sequentially summing differences between selected object image incremental area signals.

5. A system for tracking the angular position of the center of a designated one of a plurality of objects comprising:

receiver means, including an image plane sensor having a surface, for forming images of objects on said sensor surface in response to energy received from said objects, readout means coupled to said receiver means for developing video signals representative of the relative intensity of said images on said sensor surface, video processor means, coupled to said readout means, for sequentially developing signals representative of object image area increments, in selected fourth parts of said image plane sensor surface, for objects of substantially the same intensity as a designated object, control means coupled to said readout means for developing control signals which designate the object to be tracked, logic means, coupled to said control means and video processor means and responding to said control signals and said object image area signals, for developing signals representative of object area increments only the designated object, integrator means, coupled to said logic means and said readout means and responsive to said signals representative of object image area increments of said designated object, for determining the relative angular position of the center of said designated object by sequentially summing differences between selected object image incremental area signals, and linear processor means coupled between said logic means and said integrator means for respectively dividing said designated object area incremental signals by functions of two transverse dimensions of the designated object to respectively provide first and second incremental linear dimension signals, and in which said integrator means determines the relative angular position of the approximate center of said designated object by sequentially summing the differences between selected sequences of said first and second linear dimension signals.

6. The system of claim 5 further comprising:

timing means coupled to said readout means and said integrator means for developing timing signals representative of the approximate center of said designated object image on said sensor surface, pulse forming means coupled to said logic means and responding to said signals representative of object area incrementas of only said designated object to develop intensification signals representative of the occurrence of increments of the perimeter of the said designated object image, and display means coupled to said timing means, pulse forming means and readout means and responding to said timing signals, intensification signals and said video signals for displaying images of said objects, reference marks representative of the approximate center of said designated object image and contour marks representative of the perimeter of said designated object image.

7. A tracking system for determining the angular position in first and second orthogonal planes of the center of a designated object comprising:

receiver means, including focusing means and an image plane sensor, for forming images of objects on said sensor in response to energy received from said objects, readout means, including an electron beam, coupled to said receiver means for developing a video signal with an amplitude representative of the energy density of the portion of said sensor being scanned by said electron beam, first and second deflection means, coupled to said readout means, for controlling the movement of said electron beam along horizontal and vertical coordinates, first programmer means coupled to said first deflection means for providing a horizontal deflection signal for scanning said electron beam back and forth at a predetermined rate along said horizontal coordinate, second programer means coupled to said second deflection means for providing a vertical deflection signal for scanning said electron beam along said vertical coordinate so that said electron beam scans pairs of horizontal lines alternately above and below the approximate center of a designated image in a sequence progressing from said center to the vertical extremes of said sensor, synchronization means coupled to said first and second programmer means for synchronizing said first and second deflection signals and for providing synchronization signals, first video processor means coupled to said readout means for developing signals representative of image area increments of objects that are of substantially the same intensity as a designated object, first and second control means for respectively developing first and second control signals for designating the object to be tracked, first integrator means, coupled to said synchronization means and said first control means, for developing a first position signal representative of the relative horizontal center of said designated image by an accumulation of the difference of alternate said target signals, first logic means coupled to said synchronization means, said first integrator means and said first programmer means, to develop timing signals coincident with the approximate horizontal center of said designated image, said first logic means being responsive to said horizontal deflection signal and said first position signal for adjusting the relative time of occurrence of said timing signals for substantial coincidence with the horizontal center of said designated image, second logic means coupled to said synchronization means for developing gating signals representative of the time occurrence of the vertical perimeter of said designated image, second video processor means coupled to said first video processor means, said first integrator means and said first and second logic means and responding to said image area increment signals, timing signals and gating signals, for developing target signals each horizontal scan which are representative of the designated object area increments that are scanned after the occurrence of said timing signal, and second integrator means coupled to said synchronization means, said second video processor means, said second control means and said second programmer means for providing a second position signal representative of the vertical center of said designated image by an accumulation of the difference of alternate pairs of said target signals, said second programmer means in response to said second position signal adjusting the vertical starting position of the subsequent vertical readout frame.

8. The system of claim 7 further including:

third logic means coupled to said second video processor means and responding to said target signals for developing intensity signals representative of the outer intensity contour of the portion of said designated image being tracked, and display means, including a control grid, write beam, display surface and deflection terminals for displaying image of objects in response to said video signals, for displaying two transverse reference lines whose point of interaction designates the image being tracked, and for displaying intensity marks at the outer intensity contour of the portion of said designated object image being tracked, said deflection terminals coupled to said first and second programmer means and responding to said first and second deflection signals for controlling the position of said write beam, said control grid coupled to said readout means, first logic means, synchronization means and said third logic means and responding to said video signals, timing signals and intensity marker signals for modulating the intensity of said write beam.

9. The system of claim 7 further including:

linear processor means coupled between said second video processor means and said first and second integrator means, said linear processor means being further coupled to said synchronizing means and responding to said target signals and said synchronization signals to develop signals representative of the height and width of said designated object image and for dividing said target signals by a function of said height and width signals to develop first and second linear target signals respectively, and said first integrator means responding to said first linear target signals to develop said first position signals by an accumulation of the difference of selected adjacent first linear target signals, and said second integrator means responding to said second linear target signals to develop said second position signals by an accumulation of the difference of alternate pairs of said target signals.

10. The system of claim 9 in which said second programmer means further includes:

means for sensing a condition of the electron beam scan pattern reaching an upper or lower extreme of said sensor and then modifying said second deflection signal so as to control the vertical position of said electron beam to be maintained on the unscanned portion of the said sensor in a continuous scan pattern.

11. The system defined in claim 10 in which said receiver means has a field of view and further including:

gimbal means for supporting said receiver means, said readout means and said first and second deflection means, and servo mechanism control means coupled to said gimbal means and said first and second integrator means and responding to said first and second position signals to position said gimbal means so that the center of said designated object is maintained within the central portion of the field of view of said receiver means.

12. A system for determining the angular position of the approximate center of a designated object with a scanned field view of a selected area in response to received energy, comprising:

electrooptical means for developing video signals representative of the relative energy intensity of any objects within the scanned field of view of the selected area surrounding and including the designated object;

processing means coupled to said electrooptical means for sequentially developing signals having time durations representative of the size of object area increments in selected quadrants of said designated object;

linear processor means coupled to said processing means for respectively dividing said designated object area increment signals by functions of two transverse dimensions of the designated object to provide first and second incremental linear dimension signals; and integrator means coupled to said linear processor means for determining the relative angular position of the approximate center of said designated object by sequentially summing the differences between selected sequences of said first and second linear dimension signals.

13. The system of claim 12 wherein said processing means includes:

a video processor coupled to said logic means and said electrooptical means for sequentially developing signals representative of image area increments of objects that are substantially the same intensity as said designated object and within said field of view;

control means coupled to said electrooptical means for developing control signals which designate the object to be tracked; and logic means coupled to said electrooptical means and said control means and responsive to said object area increment signals and said control signals for developing signals representative of object area increments of only said designated object.

References Cited

UNITED STATES PATENTS

| | | | |
|---|---|---|---|
| 2,425,956 | 8/1947 | Salinger | 250—203 |
| 2,774,964 | 12/1956 | Baker | 178—6.8 |
| 2,877,354 | 3/1959 | Fairbanks | 343—7.4 |
| 3,010,024 | 11/1961 | Barnett | 178—6.8 |
| 3,043,907 | 7/1962 | Martin | 178—6.8 |
| 3,046,332 | 7/1962 | Engler | 178—6.8 |
| 3,114,859 | 12/1963 | Fathaver | 178—7.2 |
| 3,199,400 | 8/1965 | Zabinski | 250—203 |
| 3,257,505 | 6/1966 | Van Wechel | 178—6.8 |
| 3,315,032 | 4/1967 | Hecker | 178—6.8 |
| 3,341,653 | 9/1967 | Kruse | 178—6.8 |

ROBERT L. GRIFFIN, Primary Examiner

JOSEPH A. ORSINO, JR., Assistant Examiner

U.S. Cl. X.R.

178—7.2; 250—203